United States Patent
Rodriguez et al.

(10) Patent No.: US 9,609,039 B2
(45) Date of Patent: *Mar. 28, 2017

(54) SPLICE SIGNALLING BUFFER CHARACTERISTICS

(71) Applicant: Cisco Technology, Inc., San Jose, CA (US)

(72) Inventors: Arturo A. Rodriguez, Norcross, GA (US); Samie Beheydt, Geluwe (BE); Jan Louis De Lameillieure, Kortrijk (BE); James Ka Sin Au, Richmond, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/591,037

(22) Filed: Jan. 7, 2015

(65) Prior Publication Data

US 2015/0127847 A1    May 7, 2015

Related U.S. Application Data

(63) Continuation of application No. 12/779,035, filed on May 12, 2010, now Pat. No. 8,949,883.

(Continued)

(51) Int. Cl.
*H04N 21/23* (2011.01)
*H04N 21/44* (2011.01)
(Continued)

(52) U.S. Cl.
CPC ........ *H04L 65/607* (2013.01); *H04L 65/4069* (2013.01); *H04L 65/601* (2013.01); *H04N 21/23424* (2013.01); *H04N 21/44016* (2013.01)

(58) Field of Classification Search
None
See application file for complete search history.

(56) References Cited

U.S. PATENT DOCUMENTS

| 4,764,805 | A | 8/1988 | Rabbani et al. |
| 5,440,345 | A | 8/1995 | Shimoda |

(Continued)

FOREIGN PATENT DOCUMENTS

| CA | 2 693 389 | 6/2014 |
| CN | 101129066 | 2/2008 |

(Continued)

OTHER PUBLICATIONS

U.S. Appl. No. 12/417,864, filed Apr. 3, 2009 entitled "System and Method for Authorization of Segment Boundary Notifications", Inventors: Theodore R. Grevers, Arturo A. Rodriguez, and Anthony J. Wasilewski.

(Continued)

*Primary Examiner* — Reza Aghevli
(74) *Attorney, Agent, or Firm* — Merchant & Gould P.C.

(57) ABSTRACT

In one method embodiments, providing a transport stream to a client device, the transport stream comprising a head stream and a tail stream, the head stream and the tail stream each comprising a compressed video sequence; providing information in a transport stream packet associated with the head stream, the information configured to cause the client device to selectively control an output of at least one of a plurality of pictures of the head stream yet to be output from a decoded picture buffer (DPB) at an out-point from the head stream to the trail stream.

18 Claims, 5 Drawing Sheets

Related U.S. Application Data

(60) Provisional application No. 61/177,336, filed on May 12, 2009.

(51) Int. Cl.
  *H04L 29/06* (2006.01)
  *H04N 21/234* (2011.01)

(56) References Cited

U.S. PATENT DOCUMENTS

| | | | |
|---|---|---|---|
| 5,606,359 A | 2/1997 | Youden | |
| 5,734,443 A | 3/1998 | O'Grady | |
| 5,734,783 A | 3/1998 | Shimoda | |
| 5,828,370 A | 10/1998 | Moeller et al. | |
| 5,854,873 A | 12/1998 | Mori et al. | |
| 5,917,830 A | 6/1999 | Chen et al. | |
| 5,917,988 A | 6/1999 | Eto | |
| 5,943,447 A | 8/1999 | Tkhor et al. | |
| 5,949,948 A | 9/1999 | Krause et al. | |
| 5,963,260 A | 10/1999 | Bakhmutsky | |
| 5,970,028 A | 10/1999 | Shimabukuro | |
| 6,038,000 A * | 3/2000 | Hurst, Jr. | G11B 27/031 348/705 |
| 6,137,834 A | 10/2000 | Wine et al. | |
| 6,144,375 A | 11/2000 | Jain et al. | |
| 6,160,889 A | 12/2000 | Yagasaki | |
| 6,188,436 B1 | 2/2001 | Williams et al. | |
| 6,201,927 B1 | 3/2001 | Commer | |
| 6,222,979 B1 | 4/2001 | Willis et al. | |
| 6,263,022 B1 | 7/2001 | Chen et al. | |
| 6,304,714 B1 | 10/2001 | Krause | |
| 6,310,915 B1 | 10/2001 | Wells et al. | |
| 6,393,057 B1 | 5/2002 | Thoreau et al. | |
| 6,411,725 B1 | 6/2002 | Rhoads | |
| 6,421,387 B1 | 7/2002 | Rhee | |
| 6,453,115 B1 | 9/2002 | Boyle | |
| 6,512,552 B1 | 1/2003 | Subramanian | |
| 6,587,506 B1 | 7/2003 | Noridomi et al. | |
| 6,594,798 B1 | 7/2003 | Chou et al. | |
| 6,608,933 B1 | 8/2003 | Dowell | |
| 6,643,327 B1 | 11/2003 | Wang | |
| 6,658,199 B1 | 12/2003 | Hallberg | |
| 6,678,332 B1 | 1/2004 | Gardere | |
| 6,754,373 B1 | 6/2004 | de Cuetos et al. | |
| 6,763,390 B1 * | 7/2004 | Kovacevic | H04N 21/23608 348/E5.005 |
| 6,785,289 B1 | 8/2004 | Ward et al. | |
| 6,806,909 B1 | 10/2004 | Radha et al. | |
| 6,906,743 B1 | 6/2005 | Maurer | |
| 6,907,075 B2 | 6/2005 | Felts et al. | |
| 6,909,743 B1 | 6/2005 | Ward et al. | |
| 6,912,251 B1 | 6/2005 | Ward et al. | |
| 6,980,594 B2 | 12/2005 | Wang et al. | |
| 6,993,081 B1 | 1/2006 | Brunheroto et al. | |
| 6,999,424 B1 | 2/2006 | Kovacevic et al. | |
| 7,027,713 B1 | 4/2006 | Hallberg | |
| 7,050,603 B2 | 5/2006 | Rhoads | |
| 7,053,874 B2 | 5/2006 | Koyama | |
| 7,085,322 B2 | 8/2006 | Ngai et al. | |
| 7,085,381 B2 * | 8/2006 | Kubota | H04N 7/1675 375/E7.022 |
| 7,085,424 B2 | 8/2006 | Kajiki et al. | |
| 7,095,783 B1 | 8/2006 | Sotheran et al. | |
| 7,096,481 B1 * | 8/2006 | Forecast | H04N 21/23406 348/E5.008 |
| 7,113,523 B1 | 9/2006 | Kubota et al. | |
| 7,129,962 B1 | 10/2006 | Cote et al. | |
| 7,185,018 B2 | 2/2007 | Archbold | |
| 7,224,730 B2 | 5/2007 | Kim et al. | |
| 7,236,520 B2 | 6/2007 | Kim et al. | |
| 7,239,801 B2 | 7/2007 | Himeno et al. | |
| 7,243,193 B2 | 7/2007 | Walmsley | |
| 7,317,839 B2 | 1/2008 | Holcomb | |
| 7,376,335 B2 | 5/2008 | De Haan | |
| 7,397,858 B2 | 7/2008 | Garrido et al. | |
| 7,443,889 B2 | 10/2008 | Gonguet et al. | |
| 7,467,297 B2 | 12/2008 | Ji et al. | |
| 7,480,335 B2 | 1/2009 | Payson | |
| 7,577,198 B2 | 8/2009 | Holcomb | |
| 7,584,495 B2 | 9/2009 | Hannuksela et al. | |
| 7,586,924 B2 | 9/2009 | Wiegand | |
| 7,590,180 B2 | 9/2009 | Kang | |
| 7,599,435 B2 | 10/2009 | Marpe et al. | |
| 7,599,438 B2 | 10/2009 | Holcomb | |
| 7,606,308 B2 | 10/2009 | Holcomb | |
| 7,616,692 B2 | 11/2009 | Holcomb | |
| 7,620,106 B2 | 11/2009 | Holcomb | |
| 7,623,574 B2 | 11/2009 | Holcomb | |
| 7,649,937 B2 | 1/2010 | Rabenold et al. | |
| 7,656,410 B2 | 2/2010 | Chiu | |
| 7,720,145 B2 | 5/2010 | Muthukrishnan et al. | |
| 7,733,910 B2 | 6/2010 | Mace et al. | |
| 7,733,956 B1 | 6/2010 | Kalra et al. | |
| 7,751,324 B2 | 7/2010 | Vadakital et al. | |
| 7,793,329 B2 | 9/2010 | Joshi et al. | |
| 7,809,059 B2 | 10/2010 | Yin et al. | |
| 7,809,060 B2 | 10/2010 | Toma et al. | |
| 7,889,788 B2 | 2/2011 | Toma et al. | |
| 7,903,743 B2 | 3/2011 | Ho | |
| 7,912,219 B1 | 3/2011 | Michener et al. | |
| 8,102,406 B2 | 1/2012 | Peleg et al. | |
| 8,136,140 B2 | 3/2012 | Hodge | |
| 8,155,207 B2 | 4/2012 | Rodriguez et al. | |
| 8,218,651 B1 | 7/2012 | Eshet et al. | |
| 8,254,446 B2 * | 8/2012 | Toma | G11B 27/005 375/240.12 |
| 8,259,814 B2 | 9/2012 | Rodriguez et al. | |
| 8,259,817 B2 | 9/2012 | Rodriguez et al. | |
| 8,265,154 B2 | 9/2012 | Gardner | |
| 8,279,926 B2 | 10/2012 | Rodriguez et al. | |
| 8,320,465 B2 | 11/2012 | Rodriguez et al. | |
| 8,326,131 B2 | 12/2012 | Rodriguez | |
| 8,416,858 B2 | 4/2013 | Rodriguez et al. | |
| 8,416,859 B2 | 4/2013 | Rodriguez et al. | |
| 8,681,876 B2 | 3/2014 | Rodriguez et al. | |
| 8,699,578 B2 | 4/2014 | Rodriguez et al. | |
| 8,705,631 B2 | 4/2014 | Shepherd et al. | |
| 8,718,388 B2 | 5/2014 | Rodriguez et al. | |
| 8,761,266 B2 | 6/2014 | Rodriguez et al. | |
| 8,782,261 B1 | 7/2014 | Rodriguez et al. | |
| 8,804,843 B2 | 8/2014 | Rodriguez et al. | |
| 8,804,845 B2 | 8/2014 | Rodriguez et al. | |
| 8,873,932 B2 | 10/2014 | Rodriguez et al. | |
| 8,875,199 B2 | 10/2014 | Rodriguez et al. | |
| 8,886,022 B2 | 11/2014 | Rodriguez et al. | |
| 8,949,883 B2 | 2/2015 | Rodriguez et al. | |
| 8,959,486 B2 | 2/2015 | Rodriguez et al. | |
| 8,971,402 B2 | 3/2015 | Rodriguez et al. | |
| 9,350,999 B2 | 5/2016 | Rodriguez et al. | |
| 9,407,935 B2 | 8/2016 | Rodriguez et al. | |
| 9,521,420 B2 | 12/2016 | Rodriguez et al. | |
| 2001/0036355 A1 * | 11/2001 | Kelly | G11B 27/034 386/290 |
| 2002/0071485 A1 | 6/2002 | Caglar et al. | |
| 2002/0075402 A1 | 6/2002 | Robson et al. | |
| 2002/0092017 A1 | 7/2002 | Klosterman et al. | |
| 2002/0133819 A1 | 9/2002 | Jackson | |
| 2002/0149591 A1 | 10/2002 | Van Der Vleuten et al. | |
| 2002/0162111 A1 | 10/2002 | Shimizu et al. | |
| 2002/0172281 A1 | 11/2002 | Mantchala et al. | |
| 2002/0176025 A1 | 11/2002 | Kim | |
| 2002/0178444 A1 | 11/2002 | Trajkovic et al. | |
| 2003/0012554 A1 | 1/2003 | Zeidler et al. | |
| 2003/0016876 A1 | 1/2003 | Chai et al. | |
| 2003/0043847 A1 | 3/2003 | Haddad | |
| 2003/0067479 A1 | 4/2003 | Jung et al. | |
| 2003/0072555 A1 | 4/2003 | Yap et al. | |
| 2003/0081934 A1 | 5/2003 | Kirmuss | |
| 2003/0093418 A1 | 5/2003 | Archbold | |
| 2003/0093800 A1 | 5/2003 | Demas et al. | |
| 2003/0110514 A1 | 6/2003 | West et al. | |
| 2003/0113098 A1 | 6/2003 | Willis | |
| 2003/0121037 A1 | 6/2003 | Swix et al. | |

(56) References Cited

U.S. PATENT DOCUMENTS

| | | |
|---|---|---|
| 2003/0123849 A1 | 7/2003 | Nallur |
| 2003/0135857 A1 | 7/2003 | Pendakur et al. |
| 2003/0161407 A1 | 8/2003 | Murdock et al. |
| 2003/0189982 A1 | 10/2003 | MacInnis |
| 2003/0195977 A1 | 10/2003 | Liu et al. |
| 2003/0206596 A1 | 11/2003 | Carver et al. |
| 2004/0010807 A1 | 1/2004 | Urdang et al. |
| 2004/0012510 A1 | 1/2004 | Chen |
| 2004/0028227 A1 | 2/2004 | Yu |
| 2004/0040035 A1 | 2/2004 | Carlucci et al. |
| 2004/0047469 A1 | 3/2004 | Ryan |
| 2004/0056884 A1 | 3/2004 | Eifrig et al. |
| 2004/0071354 A1 | 4/2004 | Adachi et al. |
| 2004/0078186 A1 | 4/2004 | Nair |
| 2004/0128578 A1 | 7/2004 | Jonnalagadda |
| 2004/0133908 A1 | 7/2004 | Smith et al. |
| 2004/0139462 A1 | 7/2004 | Hannuksela et al. |
| 2004/0177369 A1 | 9/2004 | Akins |
| 2004/0179619 A1 | 9/2004 | Tian et al. |
| 2004/0187160 A1 | 9/2004 | Cook |
| 2004/0210925 A1 | 10/2004 | Miyazawa et al. |
| 2004/0218816 A1 | 11/2004 | Hannuksela |
| 2004/0228413 A1 | 11/2004 | Hannuksela |
| 2004/0230994 A1 | 11/2004 | Urdang et al. |
| 2004/0257472 A1 | 12/2004 | Mpr et al. |
| 2005/0002574 A1 | 1/2005 | Fukuhara et al. |
| 2005/0013249 A1 | 1/2005 | Kong et al. |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0058201 A1 | 3/2005 | Fernandes |
| 2005/0069212 A1 | 3/2005 | Bottreau et al. |
| 2005/0084166 A1 | 4/2005 | Boneh et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0226323 A1 | 10/2005 | Secker |
| 2005/0226325 A1 | 10/2005 | Dei et al. |
| 2005/0226327 A1 | 10/2005 | Kim |
| 2005/0229225 A1 | 10/2005 | Klausberger et al. |
| 2005/0254498 A1 | 11/2005 | Itoh |
| 2005/0259946 A1 | 11/2005 | Kitamura |
| 2005/0281328 A1* | 12/2005 | Hurst ............... H04N 21/23424 375/240 |
| 2005/0281329 A1 | 12/2005 | Chin |
| 2006/0013305 A1 | 1/2006 | Sun |
| 2006/0036551 A1 | 2/2006 | Oliveira et al. |
| 2006/0072597 A1 | 4/2006 | Hannuksela |
| 2006/0075449 A1 | 4/2006 | Jagadeesan et al. |
| 2006/0083298 A1 | 4/2006 | Wang |
| 2006/0083311 A1 | 4/2006 | Winger |
| 2006/0093045 A1* | 5/2006 | Anderson ........ H04N 21/23424 375/240.28 |
| 2006/0093315 A1 | 5/2006 | Kelley et al. |
| 2006/0104356 A1 | 5/2006 | Crinon |
| 2006/0109856 A1 | 5/2006 | Deshpande |
| 2006/0117357 A1 | 6/2006 | Surline |
| 2006/0120463 A1 | 6/2006 | Wang |
| 2006/0126728 A1 | 6/2006 | Yu et al. |
| 2006/0129914 A1 | 6/2006 | Ellis |
| 2006/0132822 A1 | 6/2006 | Walmsley |
| 2006/0133645 A1 | 6/2006 | Rhoads et al. |
| 2006/0147121 A1 | 7/2006 | Maeda et al. |
| 2006/0170571 A1 | 8/2006 | Martinian et al. |
| 2006/0171471 A1 | 8/2006 | Zhou |
| 2006/0188169 A1 | 8/2006 | Tener et al. |
| 2006/0222319 A1 | 10/2006 | Russ |
| 2006/0224763 A1 | 10/2006 | Altunbasak et al. |
| 2006/0227873 A1 | 10/2006 | Toebes et al. |
| 2006/0262861 A1 | 11/2006 | Kobayashi |
| 2006/0277566 A1 | 12/2006 | Vince et al. |
| 2006/0282319 A1 | 12/2006 | Maggio |
| 2006/0294171 A1 | 12/2006 | Bossen |
| 2007/0011447 A1 | 1/2007 | Murray et al. |
| 2007/0019724 A1 | 1/2007 | Tourapis |
| 2007/0025688 A1 | 2/2007 | Pejhan |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0038921 A1 | 2/2007 | Pekonen et al. |
| 2007/0053665 A1 | 3/2007 | Kato |
| 2007/0064739 A1 | 3/2007 | Krishnamachari |
| 2007/0081586 A1 | 4/2007 | Raveendran et al. |
| 2007/0091997 A1 | 4/2007 | Fogg et al. |
| 2007/0101359 A1 | 5/2007 | Schiller et al. |
| 2007/0106760 A1 | 5/2007 | Houh et al. |
| 2007/0109409 A1 | 5/2007 | Yea |
| 2007/0112721 A1 | 5/2007 | Archbold |
| 2007/0116277 A1 | 5/2007 | Ro et al. |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0147686 A1 | 6/2007 | Joshi |
| 2007/0153679 A1 | 7/2007 | Jost et al. |
| 2007/0153916 A1 | 7/2007 | Demircin et al. |
| 2007/0172133 A1 | 7/2007 | Kim |
| 2007/0183494 A1 | 8/2007 | Hannuksela |
| 2007/0186240 A1 | 8/2007 | Ward et al. |
| 2007/0194975 A1 | 8/2007 | Jang et al. |
| 2007/0223595 A1 | 9/2007 | Hannuksela et al. |
| 2007/0230460 A1 | 10/2007 | Jeong et al. |
| 2007/0230496 A1 | 10/2007 | Guo et al. |
| 2007/0242139 A1 | 10/2007 | Horita et al. |
| 2007/0245382 A1 | 10/2007 | Doi et al. |
| 2007/0250890 A1 | 10/2007 | Joshi |
| 2007/0253490 A1 | 11/2007 | Makino |
| 2007/0280350 A1 | 12/2007 | Mathew et al. |
| 2007/0286280 A1 | 12/2007 | Saigo et al. |
| 2007/0286283 A1 | 12/2007 | Yin et al. |
| 2007/0292107 A1 | 12/2007 | Yahata et al. |
| 2007/0297460 A1 | 12/2007 | Muneishi et al. |
| 2008/0013620 A1 | 1/2008 | Hannuksela et al. |
| 2008/0022340 A1 | 1/2008 | Hannuksela et al. |
| 2008/0025399 A1 | 1/2008 | Le Leannec et al. |
| 2008/0037656 A1 | 2/2008 | Hannuksela |
| 2008/0037658 A1 | 2/2008 | Price et al. |
| 2008/0037957 A1 | 2/2008 | Nallur et al. |
| 2008/0044164 A1 | 2/2008 | Fujinami |
| 2008/0055463 A1 | 3/2008 | Lerner |
| 2008/0056358 A1 | 3/2008 | Fuchie et al. |
| 2008/0056383 A1 | 3/2008 | Ueki et al. |
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137728 A1 | 6/2008 | Van Der Stok et al. |
| 2008/0137742 A1 | 6/2008 | Chen |
| 2008/0141091 A1 | 6/2008 | Kalluri |
| 2008/0151101 A1 | 6/2008 | Tian et al. |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0219393 A1 | 9/2008 | Toma et al. |
| 2008/0225850 A1 | 9/2008 | Oran et al. |
| 2008/0225951 A1 | 9/2008 | Young |
| 2008/0235722 A1 | 9/2008 | Baugher et al. |
| 2008/0244658 A1 | 10/2008 | Chen |
| 2008/0247463 A1 | 10/2008 | Buttimer |
| 2008/0253466 A1 | 10/2008 | Fu |
| 2008/0256409 A1 | 10/2008 | Oran et al. |
| 2008/0260045 A1 | 10/2008 | Rodriguez et al. |

(56) References Cited

U.S. PATENT DOCUMENTS

| | | |
|---|---|---|
| 2008/0263581 A1 | 10/2008 | Turner |
| 2008/0273596 A1 | 11/2008 | Oguz et al. |
| 2008/0276267 A1 | 11/2008 | Badt et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003439 A1 | 1/2009 | Wang et al. |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Shuh |
| 2009/0028447 A1 | 1/2009 | Yatabe et al. |
| 2009/0033791 A1 | 2/2009 | Rodriguez |
| 2009/0034627 A1 | 2/2009 | Rodriguez et al. |
| 2009/0034633 A1 | 2/2009 | Rodirguez et al. |
| 2009/0041130 A1 | 2/2009 | Yoon et al. |
| 2009/0073928 A1 | 3/2009 | Power |
| 2009/0086816 A1 | 4/2009 | Leontaris et al. |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0196571 A1 | 8/2009 | Rodriguez et al. |
| 2009/0199231 A1 | 8/2009 | Tsuria et al. |
| 2009/0201988 A1 | 8/2009 | Gazier et al. |
| 2009/0207904 A1 | 8/2009 | Pandit et al. |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0285284 A1 | 11/2009 | Toma et al. |
| 2009/0296811 A1 | 12/2009 | Jeon |
| 2009/0310934 A1 | 12/2009 | Rodriguez et al. |
| 2009/0313662 A1 | 12/2009 | Rodriguez |
| 2009/0313668 A1 | 12/2009 | Shepherd |
| 2009/0323822 A1 | 12/2009 | Rodriguez et al. |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0074340 A1 | 3/2010 | Luo et al. |
| 2010/0088717 A1 | 4/2010 | Candelore et al. |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0150527 A1 | 6/2010 | Sandoval |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0292820 A1 | 11/2010 | Yahata et al. |
| 2010/0293571 A1 | 11/2010 | Rodriguez |
| 2010/0322302 A1 | 12/2010 | Rodriguez |
| 2011/0222837 A1 | 9/2011 | Walton et al. |
| 2012/0189332 A1 | 7/2012 | Rodriguez et al. |
| 2012/0263228 A1 | 10/2012 | Rodriguez et al. |
| 2013/0028314 A1 | 1/2013 | Rodriguez et al. |
| 2014/0226730 A1 | 8/2014 | Rodriguez et al. |
| 2014/0307804 A1 | 10/2014 | Rodriguez et al. |
| 2014/0351854 A1 | 11/2014 | Rodriguez et al. |
| 2015/0016549 A1 | 1/2015 | Rodriguez et al. |
| 2015/0016806 A1 | 1/2015 | Rodriguez et al. |
| 2015/0117552 A1 | 4/2015 | Rodriguez et al. |
| 2015/0189303 A1 | 7/2015 | Rodriguez et al. |
| 2016/0345029 A1 | 11/2016 | Rodriguez et al. |

FOREIGN PATENT DOCUMENTS

| | | |
|---|---|---|
| CN | ZL200908 0145072.2 | 7/2014 |
| EP | 0 812 112 A2 | 12/1997 |
| EP | 1 292 138 A2 | 3/2003 |
| EP | 1 328 119 A1 | 7/2003 |
| EP | 1 480 460 A1 | 11/2004 |
| JP | 05-236465 A | 9/1993 |
| KR | 10-2004-0054708 A | 6/2004 |
| WO | WO 00/00981 A2 | 1/2000 |
| WO | WO 00/62552 A2 | 10/2000 |
| WO | WO 01/01702 | 1/2001 |
| WO | WO 01/43440 A | 6/2001 |
| WO | WO 01/63774 A | 8/2001 |
| WO | WO 2004/102571 A1 | 11/2004 |
| WO | WO 2005/106875 A1 | 11/2005 |
| WO | 2006073207 A2 | 7/2006 |
| WO | WO 2006/083824 A2 | 8/2006 |
| WO | WO 2006/101979 A | 9/2006 |
| WO | WO 2006/114761 A1 | 11/2006 |
| WO | WO 2008/005040 A1 | 1/2008 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

U.S. Appl. No. 12/492,117, filed Jun. 25, 2009 entitled "Support for Blocking Trick Mode Operations", Inventors: Arturo A. Rodriguez and Benjamin M. Cook.

U.S. Appl. No. 12/483,925, filed Jun. 12, 2009 entitled "Picture Interdependencies Signals in Context of. MMCO to Assist Stream Manipulation", Inventors: Arturo A. Rodriguez and Benjamin M. Cook.

U.S. Appl. No. 12/417,868, filed Apr. 3, 2009 entitled "Segment Boundary Notification to a Digital Media Receiver", Inventors: Theodore R. Grevers, Arturo A. Rodriguez, and Anthony J. Wasilewski.

U.S. Appl. No. 12/417,869, filed Apr. 3, 2009 entitled "System and Method for Processing Segment Boundary Notifications", Inventors: Theodore R. Grevers, Arturo A. Rodriguez, and Anthony J. Wasilewski.

U.S. Appl. No. 12/709,851, filed Feb. 22, 2010 entitled "Signalling of Decodable Sub-Sequences", Inventor: Arturo A. Rodriguez.

U.S. Appl. No. 12/713,153, filed Feb. 25, 2010 entitled "Signalling of Auxiliary Information that Assists Processing of Video According to Various Formats", Inventors: Rodriguez et al.

U.S. Appl. No. 12/722,117, filed Mar. 11, 2010 entitled "Management of Picture Referencing in Video Streams for Plural Playback Modes", Inventors: Walton et al.

U.S. Appl. No. 12/779,035, filed May 12, 2010 entitled "Signalling Buffer Characteristics for Splicing Operations of Video Streams", Inventors: Rodriguez et al.

U.S. Appl. No. 12/616,974, filed Nov. 12, 2009, entitled "Error Concealment of Plural Processed Representations of a Single Video Signal Received in a Video Program", Rodriguez et al.

(56) References Cited

OTHER PUBLICATIONS

U.S. Appl. No. 12/616,991, filed Nov. 12, 2009, entitled "Processing Latticed and Non-Latticed Pictures of a Video Program", Rodriguez et al.
U.S. Appl. No. 12/617,015, filed Nov. 12, 2009, entitled "Facilitating Fast Channel Changes Through Promotion of Pictures", Rodriguez et al.
U.S. Appl. No. 12/617,043, filed Nov. 12, 2009, entitled "Targeted Bit Appropriations Based on Picture Importance", Rodriguez et al.
U.S. Appl. No. 12/617,062, filed Nov. 12, 2009, entitled "Processing of a Video Program Having Plural Processed Representations of a Single Video Signal for Reconstruction and Output", Rodriguez et al.
U.S. Appl. No. 12/141,015, filed Jun. 17, 2008, entitled "Time-Shifted Transport of Multi-Latticed Video for Resiliency from Burst-Error Effects", Shepherd et al.
U.S. Appl. No. 12/141,017, filed Jun. 17, 2008, entitled "Methods and Systems for Processing Multi-Latticed Video Streams", Rodriguez et al.
U.S. Appl. No. 12/141,019, filed Jun. 17, 2008, entitled "Processing of Impaired and Incomplete Multi-Latticed Video Streams", Rodriguez et al.
U.S. Appl. No. 12/819,157, filed Jun. 18, 2010, entitled "Dynamic Streaming with Latticed Representations of Video", Rodriguez et al.
U.S. Appl. No. 13/633,672, filed Oct. 2, 2012, entitled "Dynamic Streaming Plural Lattice Video Coding Representations of Video," Rodrigeuz et al.
U.S. Appl. No. 14/253,043, filed Apr. 15, 2014, entitled "Methods and Systems for Processing Latticed Time-Skewed Video Streams," Rodrigeuz et al.
U.S. Appl. No. 14/313,266, filed Jun. 24, 2014, entitled "Receiving and Processing Multi-Latticed Video", Rodriguez et al.
U.S. Appl. No. 14/502,651, filed Sep. 30, 2014, entitled "Determining Tracking Picture Candidates with Multiple Level Tiers", Rodriguez et al.
U.S. Appl. No. 14/501,905, filed Sep. 30, 2014, entitled "Signaling Tier Information to Assist MMCO Stream Manipulation", Rodriguez et al.
Amon et al., "File Format for Scalable Video Coding", IEEE Transactions on Circuits and Systems for Video Technology, vol. 17 No. 9, Sep. 2007, pp. 1174-1185.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Hurst et al., "MPEG Splicing Tutorial and Proposed SMPTE Standard", Proceedings of the SMPTE Technical Conference, Nov. 1997, pp. 105-117.
Itu: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I PDF E.pdf, XP007905991, pp. 1-76.
ITU-T Telecommunication Standardization Sector of ITU, Infrastrcture of Audiovisual Services—Coding of Moving Video, "Advanced Video Coding for Generic Audiovisual Services", International Telecommunication Union, H.264, May 2003, XP008095420, 282 pages.
Luo et al., "On HRD conformance for splice bitstreams", JVT Meeting, Document JVT-V055r1, Filename JVT-V055r1.doc, XP-30006863, Jan. 2007, pp. 1-11.
MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.
Rodriguez et al., "SEI message to convey suitable splice points in the bitstream", JVT Meeting, Document JVT-Z040, Filename JVT-Z040.doc, XP-30007329, Jan. 2008, pp. 1-8.

"Splice Points for MPEG-2 Transport Streams", SMPTE Journal, SMPTE Inc., vol. 107 No. Oct. 1998, XP-000793004, pp. 916-925.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
Tian et al., "Sub-Sequence Video Coding for Improved Temporal Scalability", presented at the *IEEE International Symposium on Circuits and Systems—ISCAS*, pp. 6074-6077, 2005.
D.T. Nguyen and J. Ostermann, "Congestion Control using Scalable Video Coding based on H. 264/AVC," IEEE Journal of Selected Topics in Signal Processing, vol. 1 No. 2, Aug. 2007, 8 pages.
Digital Video Image Quality and Perceptual Coding edited by H.R. Wu and K.R. Rao, CRC Press 2005, pp. 503-541.
Author Unknown, SMPTE Standard for Television—Splice Points for MPEG-2 Transport Streams, The Society of Motion Picture and Television Engineers, Copyright 1999, http://www.ietf.org/mail-archive/web/avtext/current/pdf6u0ckuE66s.pdf, accessed May 30, 2012, 20 pages.
Hannuksela et al., "H.264/AVC Video for Wireless Transmission," IEEE Wireless Communications, IEEE Service Center, Piscataway, NJ, US, vol. 12, No. 4, Aug. 1, 2005 (Aug. 1, 2005), pp. 6-13.
Psannis K. et al., "Efficient Flexible Macroblock Ordering Technique," IEICE Transactions on Communications, Communications Society, Tokyo JP, vol. E19B, No. 8, Aug. 1, 2008 (Aug. 1, 2008), pp. 2692-2701.
Tom A. S. et al., "Packet Video for Cell Loss Protection Using Deinterleaving and Scrambling," Speech Processing 1. Toronto, May 14-17, 1991; [International Conference on Acoustics, Speech & Signal Processing. ICASSP], New York, IEEE, US, vol. Conf. 16, Apr. 14, 1991 (Apr. 14, 1991), pp. 2857-2860.
Schwarz H. et al., "SVC Overview," 21. JVT Metting; 78. MPEG Meeting; Oct. 20-27, 2006; Hangzhou CN; (Joint Video Team of ISO/IEC JTC1/SC29/WG11 and ITU-T SG.16), no. JVT-U145, Oct. 20, 2006 (Oct. 20, 2006), 20 pages.
Yao Wang et al., "Error Control and Concealment for Video Communication: A Review," Proceedings of the IEEE, New York, vol. 86, No. 5, May 1, 1998, 24 pages.
Zhu et al., "Coding and Cell-Loss Recovery in DCT-Based Packet Video," IEEE Transactions on Circuits and Systems for Video Technology, Jun. 3, 1993, New York U.S., 11 pages.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report dated May 23, 2008 cited in International Application No. PCT/US2007/083867.
Written Opinion dated May 23, 2008 cited in International Application No. PCT/US2007/083867.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
International Preliminary Report on Patentability and Written Opinion dated Feb. 2, 2010 cited in International Application No. PCT/US2008/071111.
International Search Report and Written Opinion dated Apr. 15, 2010 cited in International Application No. PCT/US2010/024927.
PCT Search Report cited in International Appln No. PCT/US2009/064180 mailed Jan. 8, 2010.
PCT Written Opinion cited in International Appln No. PCT/US2009/064180 mailed Jan. 8, 2010.
PCT Search Report cited in International Appln No. PCT/US2009/047521 mailed Dec. 22, 2009.
PCT Written Opinion cited in International Appln No. PCT/US2009/047521 mailed Dec. 22, 2009.
Canadian Office Action dated Dec. 11, 2009 in Application No. 2,533,169.

(56) References Cited

OTHER PUBLICATIONS

European Examination dated May 4, 2010 in Application No. 07 844 937.8.
European Examination dated Sep. 16, 2010 in Application No. 08 796 875.6.
European Communication dated Aug. 9, 2011 in Application No. 08 838 787.3, 4 pages.
European Communication dated Sep. 22, 2011 in Application No. 08796584.4, 9 pages.
European Communication dated Dec. 14, 2011 in Application No. 09 751 294.1, 5 pages.
Chinese First Office Action mailed Dec. 31, 2011 in Application No. 200880121233.X, 7 pages.
Canadian Office Action dated Jun. 6, 2012 in Application No. 2,669,552, 3 pages.
European Communication dated Jul. 5, 2012 in Application No. 08838787.3, 6 pages.
Supplementary European Search Report dated Jul. 17, 2012 in Application No. 09826735, 3 pages.
Supplementary European Search Report dated Jul. 26, 2012 in Application No. 09767598, 7 pages.
Chinese First Office Action mailed Aug. 31, 2012 in Application No. 200980118689.5, 12 pages.
Chinese First Office Action mailed Feb. 21, 2013 in Application No. 200980145072.2, 16 pages.
European Communication dated Mar. 22, 2013 in Application No. 09 826 735.4, 7 pages.
European Communication dated Mar. 22, 2013 in Application No. 09 767 598.7, 5 pages.
European Communication dated Oct. 15, 2013 in Application No. 09 767 598.7, 6 pages.
Chinese Second Office Action mailed Oct. 25, 2013 in Application No. 200980145072.2, 4 pages.
Chinese Office Action mailed Nov. 13, 2013 in Appln No. 200980124140.7, 15 pgs.
U.S. Non-final Office Action in U.S. Appl. No. 10/623,683 dated Dec. 28, 2007.
U.S. Final Office Action in U.S. Appl. No. 10/623,683 dated Jul. 25, 2008.
U.S. Non-Final Office Action in U.S. Appl. No. 11/627,452 dated Nov. 10, 2010.
U.S. Non-Final Office Action in U.S. Appl. No. 11/831,916 dated Feb. 1, 2010.
U.S. Non-Final Office Action in U.S. Appl. No. 11/831,916 dated Aug. 4, 2010.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Non-Final Office Action in U.S. Appl. No. 12/417,864 dated Apr. 18, 2011, 25 pages.
U.S. Final Office Action mailed Jul. 5, 2011 in U.S. Appl. No. 12/417,864, 13 pages.
U.S. Non-Final Office Action mailed Aug. 5, 2011 in U.S. Appl. No. 11/831,906, 38 pages.
U.S. Final Office Action mailed Aug. 5, 2011 in U.S. Appl. No. 12/417,869, 10 pages.
U.S. Non-Final Office Action mailed Sep. 14, 2011 in U.S. Appl. No. 12/124,779, 29 pages.
U.S. Non-Final Office Action mailed Sep. 22, 2011 in U.S. Appl. No. 11/831,912, 35 pages.
U.S. Final Office Action mailed Sep. 28, 2011 in U.S. Appl. No. 11/831,916, 44 pages.
U.S. Non-Final Office Action mailed Nov. 10, 2011 in U.S. Appl. No. 12/483,925, 36 pages.
U.S. Non-Final Office Action mailed Nov. 23, 2011 in U.S. Appl. No. 12/141,015, 30 pages.
U.S. Non-Final Office Action mailed Nov. 29, 2011 in U.S. Appl. No. 12/492,117, 35 pages.
U.S. Non-Final Office Action mailed Nov. 23, 2011 in U.S. Appl. No. 12/141,017, 32 pages.
U.S. Non-Final Office Action mailed Dec. 21, 2011 in U.S. Appl. No. 12/333,296, 30 pages.
U.S. Non-Final Office Action mailed Dec. 22, 2011 in U.S. Appl. No. 12/617,043, 34 pages.
U.S. Non-Final Office Action mailed Dec. 27, 2011 in U.S. Appl. No. 12/417,869, 8 pages.
U.S. Non-Final Office Action mailed Dec. 27, 2011 in U.S. Appl. No. 12/252,632, 31 pages.
U.S. Non-Final Office Action mailed Jan. 4, 2012 in U.S. Appl. No. 12/617,062, 30 pages.
U.S. Non-Final Office Action mailed Jan. 10, 2012 in U.S. Appl. No. 12/333,301, 37 pages.
U.S. Non-Final Office Action mailed Jan. 18, 2012 in U.S. Appl. No. 12/617,015, 31 pages.
U.S. Final Office Action mailed Jan. 19, 2012 in U.S. Appl. No. 12/124,779, 12 pages.
U.S. Final Office Action mailed Feb. 17, 2012 in U.S. Appl. No. 11/627,452, 11 pages.
U.S. Non-Final Office Action mailed Mar. 8, 2012 in U.S. Appl. No. 12/351,776, 31 pages.
U.S. Final Office Action mailed Mar. 13, 2012 in U.S. Appl. No. 11/831,906, 24 pages.
U.S. Final Office Action mailed Mar. 19, 2012 in U.S. Appl. No. 11/831,912, 20 pages.
U.S. Non-Final Office Action mailed Mar. 26, 2012 in U.S. Appl. No. 12/395,676, 37 pages.
U.S. Non-Final Office Action mailed Apr. 23, 2012 in U.S. Appl. No. 12/709,851, 29 pages.
U.S. Non-Final Office Action mailed Apr. 25, 2012 in U.S. Appl. No. 12/141,019, 28 pages.
U.S. Final Office Action mailed May 11, 2012 in U.S. Appl. No. 12/141,015, 25 pages.
U.S. Final Office Action mailed May 18, 2012 in U.S. Appl. No. 12/492,117, 17 pages.
U.S. Non-Final Office Action mailed May 23, 2012 in U.S. Appl. No. 12/616,974, 30 pages.
U.S. Final Office Action mailed May 23, 2012 in U.S. Appl. No. 12/333,296, 21 pages.
U.S. Final Office Action mailed May 23, 2012 in U.S. Appl. No. 12/333,301, 18 pages.
U.S. Final Office Action mailed Jun. 11, 2012 in U.S. Appl. No. 12/141,017, 23 pages.
U.S. Final Office Action mailed Jun. 4, 2012 in U.S. Appl. No. 12/252,632, 22 pages.
U.S. Non-Final Office Action mailed Jun. 15, 2012 in U.S. Appl. No. 12/124,779, 12 pages.
U.S. Non-Final Office Action mailed Jun. 20, 2012 in U.S. Appl. No. 12/722,117, 30 pages.
U.S. Non-Final Office Action mailed Jun. 25, 2012 in U.S. Appl. No. 12/417,868, 37 pages.
U.S. Final Office Action mailed Jul. 6, 2012 in U.S. Appl. No. 12/617,043, 26 pages.
U.S. Non-Final Office Action mailed Jul. 10, 2012 in U.S. Appl. No. 12/417,869, 8 pages.
U.S. Final Office Action mailed Jul. 16, 2012 in U.S. Appl. No. 12/351,776, 6 pages.
U.S. Non-Final Office Action mailed Jul. 18, 2012 in U.S. Appl. No. 12/616,991, 25 pages.
U.S. Non-Final Office Action mailed Aug. 10, 2012 in U.S. Appl. No. 12/483,925, 35 pages.
U.S. Non-Final Office Action mailed Sep. 13, 2012 in U.S. Appl. No. 12/141,015, 22 pages.
U.S. Non-Final Office Action mailed Oct. 2, 2012 in U.S. Appl. No. 12/417,864, 17 pages.
U.S. Non-Final Office Action mailed Oct. 22, 2012 in U.S. Appl. No. 12/779,035, 33 pages.
U.S. Final Office Action mailed Nov. 23, 2012 in U.S. Appl. No. 12/417,869, 16 pages.

(56) References Cited

OTHER PUBLICATIONS

U.S. Final Office Action mailed Nov. 27, 2012 in U.S. Appl. No. 12/616,991, 34 pages.
U.S. Final Office Action mailed Dec. 19, 2012 in U.S. Appl. No. 12/722,117, 24 pages.
U.S. Final Office Action mailed Jan. 4, 2013 in U.S. Appl. No. 12/417,868, 19 pages.
U.S. Non-Final Office Action mailed Jan. 24, 2013 in U.S. Appl. No. 12/713,153, 41 pages.
U.S. Non-Final Office Action mailed Feb. 26, 2013 in U.S. Appl. No. 12/617,043, 31 pages.
U.S. Final Office Action mailed Feb. 26, 2013 in U.S. Appl. No. 12/141,019, 14 pages.
U.S. Final Office Action mailed Feb. 28, 2013 in U.S. Appl. No. 12/483,925, 37 pages.
U.S. Final Office Action mailed Mar. 18, 2013 in U.S. Appl. No. 12/141,015, 23 pages.
U.S. Final Office Action mailed Mar. 18, 2013 in U.S. Appl. No. 12/417,864, 13 pages.
U.S. Non-Final Office Action mailed Mar. 20, 2013 in U.S. Appl. No. 11/831,912, 17 pages.
U.S. Final Office Action mailed Apr. 8, 2013 in U.S. Appl. No. 12/779,035, 19 pages.
U.S. Non-Final Office Action mailed Apr. 9, 2013 in U.S. Appl. No. 121/831,906, 22 pages.
U.S. Non-Final Office Action mailed Apr. 9, 2013 in U.S. Appl. No. 12/492,117, 20 pages.
U.S. Non-Final Office Action mailed Apr. 9, 2013 in U.S. Appl. No. 11/627,452, 11 pages.
U.S. Final Office Action mailed Jun. 6, 2013 in U.S. Appl. No. 12/617,043, 27 pages.
U.S. Final Office Action mailed Jun. 19, 2013 in U.S. Appl. No. 12/713,153, 19 pages.
U.S. Non-Final Office Action mailed Jun. 21, 2013 in U.S. Appl. No. 12/483,925, 40 pages.
U.S. Non-Final Office Action mailed Jul. 3, 2013 in U.S. Appl. No. 13/443,580, 25 pages.
U.S. Non-Final Office Action mailed Jul. 16, 2013 in U.S. Appl. No. 12/333,296, 32 pages.
U.S. Non-Final Office Action mailed Jul. 18, 2013 in U.S. Appl. No. 12/417,864, 14 pages.
U.S. Non-Final Office Action mailed Aug. 7, 2013 in U.S. Appl. No. 12/333,301, 20 pages.
U.S. Final Office Action mailed Sep. 6, 2013 in U.S. Appl. No. 12/492,117, 27, pages.
U.S. Non-Final Office Action mailed Sep. 6, 2013 in U.S. Appl. No. 13/633,672, 22 pages.
U.S. Non-Final Office Action mailed Sep. 11, 2013 in U.S. Appl. No. 12/722,117, 21 pages.
U.S. Final Office Action mailed Sep. 26, 2013 in U.S. Appl. No. 11/831,912, 25 pages.
U.S. Non-Final Office Action mailed Oct. 1, 2013 in U.S. 12/616,991, 18 pages.
U.S. Final Office Action mailed Nov. 12, 2013 in U.S. Appl. No. 11/627,452, 22 pages.
U.S. Final Office Action mailed Nov. 13, 2013 in U.S. Appl. No. 11/831,906, 32 pages.
U.S. Final Office Action mailed Dec. 4, 2013 in U.S. Appl. No. 13/443,580, 9 pages.
U.S. Non-Final Office Action mailed Dec. 13, 2013 in U.S. Appl. No. 12/141,019, 8 pages.
U.S. Non-Final Office Action mailed Dec. 24, 2013 in U.S. Appl. No. 12/779,035, 15 pages.
U.S. Office Action mailed Jan. 2, 2014 in U.S. Appl. No. 12/483,925, 47 pages.
U.S. Office Action mailed Jan. 16, 2014 in U.S. Appl. No. 12/333,296, 18 pages.
U.S. Office Action mailed Jan. 27, 2014 in U.S. Appl. No. 12/492,117, 23, pages.
U.S. Office Action mailed Jan. 29, 2014 in U.S. Appl. No. 12/252,632, 22 pages.
U.S. Office Action mailed Jan. 30, 2014 in U.S. Appl. No. 12/722,117, 22 pages.
U.S. Office Action mailed Feb. 10, 2014 in U.S. Appl. No. 12/713,153, 18 pages.
U.S. Office Action mailed Feb. 13, 2014 in U.S. Appl. No. 13/633,672, 5 pages.
U.S. Office Action mailed Mar. 21, 2014 in U.S. Appl. No. 11/831,906, 20 pages.
U.S. Office Action mailed Mar. 28, 2014 in U.S. Appl. No. 12/417,869, 12 pages.
U.S. Non-Final Office Action mailed May 1, 2014 in U.S. Appl. No. 12/779,035, 21 pages.
U.S. Office Action mailed Jun. 20, 2014 in U.S. Appl. No. 12/417,868, 41 pgs.
U.S. Office Action mailed Jun. 20, 2014 in U.S. Appl. No. 13/633,672, 7 pgs.
U.S. Office Action mailed Jul. 14, 2014 in U.S. Appl. No. 12/722,117, 31 pgs.
U.S. Office Action mailed Jul. 25, 2014 in U.S. Appl. No. 12/713,153, 29 pgs.
U.S. Office Action mailed Aug. 14, 2014 in U.S. Appl. No. 12/252,632, 23 pgs.
U.S. Office Action mailed Aug. 27, 2014 in U.S. Appl. No. 12/492,117, 37 pgs.
U.S. Office Action mailed Aug. 28, 2014 in U.S. Appl. No. 12/417,869, 11 pgs.
U.S. Final Office Action mailed Sep. 17, 2014 in U.S. Appl. No. 12/351,776, 29 pgs.
U.S. Office Action mailed Nov. 6, 2014 in U.S. Appl. No. 12/417,868, 41 pgs.
U.S. Office Action mailed Nov. 6, 2014 in U.S. Appl. No. 13/633,672, 7 pgs.
U.S. Office Action mailed Nov. 25, 2015 in U.S. Appl. No. 12/252,632, 26 pgs.
U.S. Notice of Allowance mailed Jan. 29, 2016 in U.S. Appl. No. 14/253,043, 18 pgs.
U.S. Office Action mailed Feb. 17, 2016 in U.S. Appl. No. 14/457,236, 20 pgs.
U.S. Notice of Allowance mailed Mar. 31, 2016 cited in U.S. Appl. No. 14/585,312, 54 pgs.
U.S. Appl. No. 14/658,293, filed Mar. 16, 2015, entitled "Assistance for Processing Pictures in Concatenated Video Streams", Rodriguez et al.
U.S. Office Action mailed Aug. 13, 2015 in U.S. Appl. No. 14/457,236, 49 pgs.
U.S. Office Action mailed Aug. 31, 2015 in U.S. Appl. No. 14/253,043, 57 pgs.
U.S. Appl. No. 14/457,236, filed Aug. 12, 2014, entitled "Managing Splice Points for Non-Seamless Concatenated Bitstreams", Rodriguez et al.
U.S. Appl. No. 14/585,312, filed Dec. 30, 2014, entitled "Reconstructing a Multi-Latticed Video Signal", Rodriguez et al.
U.S. Appl. No. 14/593,098, filed Jan. 9, 2015, entitled "Mitigating Impairments in Redundant Streams", Rodriguez et al.
European Communication mailed Jul. 3, 2014 in Appln No. 07 756 849.1, 4 pgs.
Canadian Office Action mailed Jul. 7, 2014 in Appln No. 2,669,552, 3 pgs.
Chinese Second Office Action mailed Jul. 14, 2014 in Application No. 200980124140.7, 7 pgs.
U.S. Office Action mailed Dec. 10, 2014 in U.S. Appl. No. 12/722,117, 28 pgs.
U.S. Office Action mailed May 28, 2015 in U.S. Appl. No. 12/252,632, 29 pgs.
U.S. Notice of Allowance dated Jul. 21, 2016 cited in U.S. Appl. No. 14/457,236, 26 pgs.
U.S. Office Action dated Jun. 6, 2016 cited in U.S. Appl. No. 14/502,651, 65 pgs.
U.S. Appl. No. 15/224,694, filed Aug. 1, 2016 entitled Output of a Video Signal from Decoded and Derived Picture Information, Rodriguez et al.

(56) References Cited

OTHER PUBLICATIONS

U.S. Office Action dated Jul. 5, 2016 cited in U.S. Appl. No. 12/252,632, 27 pgs.
Chinese Second Office Action dated Nov. 5, 2012 cited in Application No. 200880121233.X, 13 pgs.
European Summons to Attend Oral Proceedings dated Nov. 21, 2012 cited in Application No. 08838787.3, 4 pgs.
Chinese Third Office Action dated Apr. 27, 2013 cited in Application No. 200880121233.X, 7 pgs.
U.S. Office Action dated Sep. 7, 2016 cited in U.S. Appl. No. 14/313,266, 75 pgs.
U.S. Office Action dated Oct. 6, 2016 cited in U.S. Appl. No. 14/501,905, 60 pgs.
U.S. Office Action dated Dec. 20, 2016 cited in U.S. Appl. No. 15/224,694, 84 pgs.
U.S. Office Action dated Dec. 23, 2016 cited in U.S. Appl. No. 14/1658,293, 70 pgs.
U.S. Final Office Action dated Dec. 30, 2016 cited in U.S. Appl. No. 12/252,632, 42 pgs.

\* cited by examiner

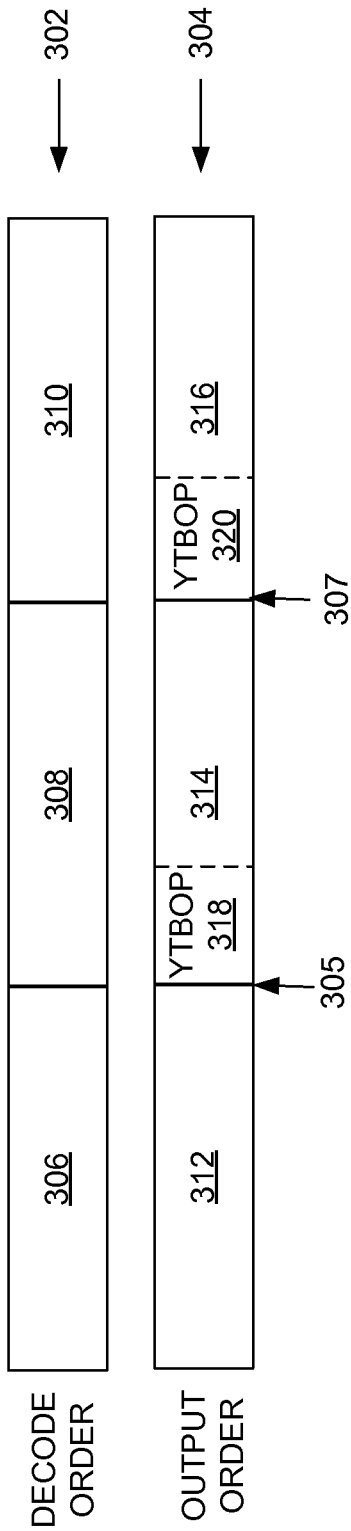
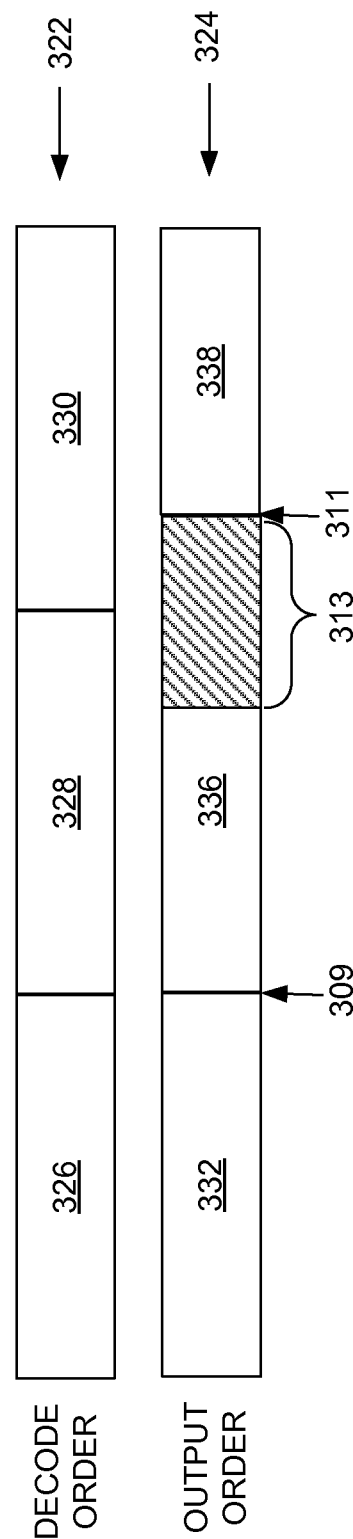
FIG. 3A
FIG. 3B

SPLICE SIGNALLING BUFFER CHARACTERISTICS

CROSS-REFERENCE TO RELATED APPLICATIONS

This application is a continuation of U.S. patent application Ser. No. 12/779,035, filed May 12, 2010, now U.S. Pat. No. 8,949,883, issued Feb. 3, 2015, which claims priority to and the benefit of U.S. Provisional Patent Application No. 61/177,336, filed on May 12, 2009, now expired, both of which are entirely incorporated herein by reference.

TECHNICAL FIELD

This disclosure relates in general to television systems, and more particularly, to video processing in television systems.

DESCRIPTION OF THE RELATED ART

Broadcast and on-demand delivery of digital audiovisual content has become increasingly popular in cable and satellite television networks (generally, subscriber television networks). Various specifications and standards have been developed for communication of audiovisual content, including the MPEG-2 video coding standard and AVC video coding standard. One feature pertaining to the provision of programming in subscriber television systems requires the ability to concatenate video segments or video sequences, for example, as when inserting television commercials or advertisements. For instance, for local advertisements to be provided in national content, such as ABC news, etc., such programming may be received at a headend (e.g., via a satellite feed), with locations in the programming allocated for insertion at the headend (e.g., headend encoder) of local advertisements.

BRIEF DESCRIPTION OF THE DRAWINGS

The systems and methods described herein can be better understood with reference to the following drawings. The components in the drawings are not necessarily drawn to scale, emphasis instead being placed upon clearly illustrating the principles of the present disclosure. In the drawings, like reference numerals designate corresponding parts throughout the several views.

FIGS. 3A-3B are block diagrams that illustrates an example embodiment of splicing mechanisms pertaining to yet to be output picture (YTBOP) intervals.

DESCRIPTION OF EXAMPLE EMBODIMENTS

Overview

Figure 1:
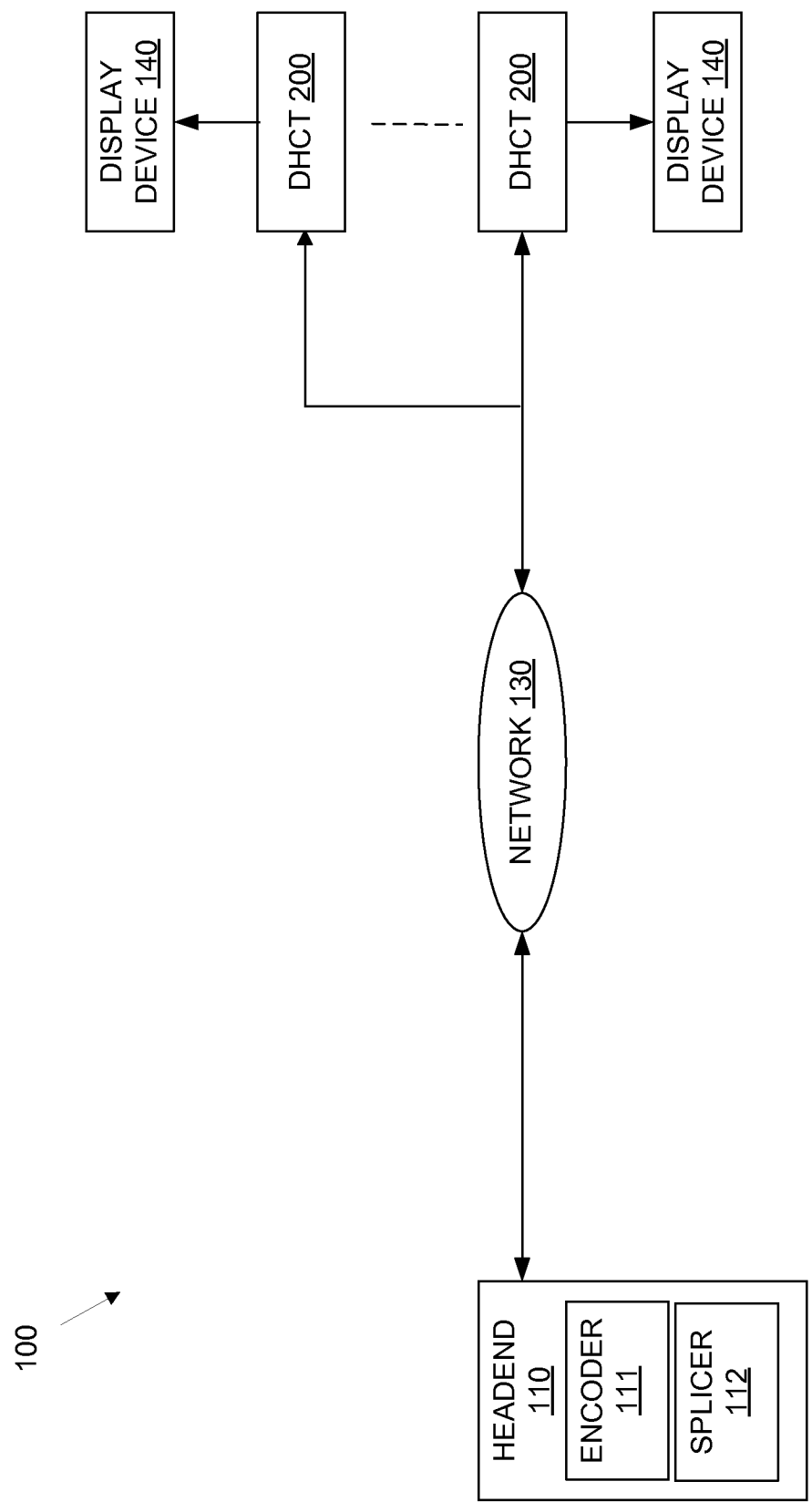
FIG. 1 is a block diagram that illustrates an example environment for implementing assistive information systems.

In one method embodiments, providing a transport stream to a splicing device, the transport stream comprising a head stream concatenated to a tail stream, the head stream and the tail stream each comprising a compressed video sequence from a separate video source; providing in an adaptation field of a transport stream packet corresponding to the head stream an out-point that corresponds to a provided splice point, the splice point provided based on presentation time stamp (PTS) value, the out-point signaled by a descriptor in a program map table (PMT), the transport packet further comprising assistive information comprising one or more compressed picture buffer properties and one or more decoded picture buffer properties that are used in the concatenation of the head stream and the tail stream.

Example Embodiments

Certain assistive information (AI) system and method embodiments are disclosed that incorporate logic to provide, receive, and/or process information (e.g., messaging) in a video stream that signals to a digital home communications terminal (DHCT) a manner of managing, processing, and/or outputting buffered pictures. In one embodiment, a splice point (cut) in the video stream that corresponds to a provided splice point, announced as a presentation time stamp (PTS), is provided in an adaptation field of a transport packet. The provision of a splice point using the PTS is via SCTE-35 cue messaging, which is the current mechanism employed in MPEG-2 video. However, with AVC/H.264, finding the exact point in the video stream (e.g., in decode or transmission order) that corresponds to such a cue that signals the splice point in the video stream with a presentation time stamp (PTS) value is difficult. In one embodiment, the AI system signals the corresponding splice point (cut) in decode order so that it may be explicitly corresponded with existing mechanisms in use today for programs that have the video encoded according to MPEG-2 video. In addition, a program map table (PMT) is used to announce that the cut exists and that it is being provided in the transport packet. The corresponding cut is provided immediately prior to the cut point in decode order.

In some embodiments of the AI system, assistive information comprising properties of a decoded picture buffer (DPB) and/or a compressed picture buffer (CPB) is provided. For instance, with regard to CPB properties, since the CPB is much larger that MPEG-2 video's bit buffer, the large headroom results in error effects that accrue until carried ailments surface. Such error effects may result from buffer underrun/overruns over multiple splice operations that may provide a compounded effect. One mechanism to address such errors is to provide, at the out-point (splice-out point), assistive information corresponding to one or more CPB properties, such as the time of buffering (DTS-STC), the buffer level, the AVC level (e.g., L3.0, L4.0, L4.2), and upper and lower bounds for the intended levels of the CPB.

In some embodiments, the in-point (splice-in point) also needs consideration. For instance, and as explained further below in association with FIGS. 3A-3B, the time or interval corresponding to the yet to be output pictures (YTBOPs) in the head stream at the out-point should be honored. For instance, when the issuance of a no_output_of_prior_pics_flag forces the decoder to disregard the output of DPB pictures (e.g., because of non-contiguous output times), the output of blank pictures may be required to maintain consistent CPB levels. With gaps in output time (e.g., non-contiguous PTS) of pictures in the DPB yet to be output at the splice point, a compliant AVC decoder is challenged—the no_output_of_prior_pics_flag is set equal to one (1) to prevent the output of those YTBOP pictures in the DPB. If the output of these decoded pictures is skipped (e.g., not displayed), a splicing device needs to improvise to for a number of output intervals equal to the number of DPB pictures that are not output (e.g., per a YTBOP flag) while accumulating pictures into the CPB to raise buffer levels (e.g., to avoid buffer underflow). With multiple splice operations, as noted above, the skipping of decoded pictures raises the risk of buffer underflow. If the latest PTS among the pictures yet to be output in the DPB at the splice point is signaled (e.g., last_PTS_flag), then a splicing device, without having to decode and determine based on the decoding operation, knows to provide that many pictures (delay their output) to compensate for the non-output, decoded pictures. While filling the CPB, a receiver either has to blank out pictures (e.g., black pictures) or continuously repeat the last output picture prior to the splice point. One mechanism to achieve this function is by the splicing device signaling the last output picture to be repeated. Further, byte stuffing in blank pictures may raise the CPB buffer level. Accordingly, the assistive information pertaining to the DPB properties includes one or more of configuring of the YTBOP of the head stream (at the out-point) with a maximum of sixteen 16 (e.g., four (4) bits), and a YTBOP_flag that provides all YTBOP pictures in the DPB have successive picture-output times and the first output time of the YTBOP pictures is the first frame interval after the out-point.

In some embodiments, the assistive information is not provided if it is not desired to output pictures from the DPB that would otherwise be discarded. Assistive information that specifies the output behavior of each non-previously output DPB picture allows for outputting a picture, not outputting, or outputting the picture for a number consecutive times prior to outputting the subsequent picture, as is explained further below.

In one embodiment, the assistive information is provided by a splicing device to a DHCT to convey information that alleviates the non-seamless transition incurred by repeating, over multiple frame times, the last output picture from a head stream at a splice operation. As a picture from the head stream is output from the DPB during a transition period from the head stream to a tail stream, control information specifies the outputting of each YTBOP from the DPB of the head stream.

Outputting may be consistent with a pic_struct, but for interlaced sources, a splicing device should provide information to prohibit the manifestation of motion jitter. Hence, for interlaced sources, the last output field of an interlaced frame is output, as both the top and bottom fields, to satisfy the repetition amount specified by command in the message.

The below description is provided in the context of a subscriber television system (STS) using a splicing device (also referred to herein as a splicer) and a DHCT that sends and receives, respectively, the messaging, with the understanding that other devices are contemplated to be within the scope of the disclosure. Additionally, the terms "frames" and "pictures" are used interchangeably herein unless specifically distinguished for purposes of explanation. Further, the discussion below is applicable to AVC access units in place of pictures. The description below also contemplates knowledge, by those having ordinary skill in the art, of MPEG-2 and AVC video coding and associated transport mechanisms, the known references or publications of which are as follows: a description of the MPEG-2 Video Coding standard can be found in the following publication: (1) ISO/IEC 13818-2, (2000), "Information Technology—Generic coding of moving pictures and associated audio—Video;" a description of the AVC video coding standard can be found in the following publication: (2) ITU-T Rec. H.264 (2005), "Advanced video coding for generic audiovisual services;" a description of MPEG-2 Systems for transporting AVC video streams in MPEG-2 Transport packets can be found in the following publications: (3) ISO/IEC 13818-1, (2000), "Information Technology—Generic coding of moving pictures and associated audio—Part 1: Systems," and (4) ITU-T Rec. H.222.0|ISO/IEC 13818-1:2000/AMD.3, (2004), "Transport of AVC video data over ITU-T Rec. H222.0|ISO/IEC 13818-1 streams."

FIG. 1 is a high-level block diagram depicting an example environment in which one or more embodiments of assistive information (AI) systems are implemented. In particular, FIG. 1 is a block diagram that depicts an example subscriber television system (STS) 100. In this example, the STS 100 includes a headend 110 and one or more digital home communications terminals (DHCTs) 200. The DHCTs 200 and the headend 110 are coupled via a network 130. The headend 110 and the DHCTs 200 cooperate to provide a user with television services, including, for example, broadcast television programming, interactive program guide (IPG) services, video-on-demand (VOD), and pay-per-view, as well as other digital services such as music, Internet access, commerce (e.g., home-shopping), voice-over-IP (VOIP), and/or other telephone or data services.

The STS 100 may comprise an IPTV network, a cable television network, a satellite television network, or a combination of two or more of these networks or other networks. Further, network PVR and switched digital video are also considered within the scope of the disclosure. Although described in the context of video processing, it should be understood that certain embodiments of the AI systems described herein also include functionality for the processing of other media content such as compressed audio streams.

The headend 110 may include one or more server devices (not shown) for providing video, audio, and other types of media or data to client devices such as, for example, the DHCT 200. The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. The headend 110 also receives splice triggers indicative of suitable splice points in the network feed. The headend 110 also includes one or more encoders (encoding devices or compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed among different locations within the STS 100. For instance, though shown residing at the headend 110, the encoder 111 and/or splicer 112 may reside in some embodiments at other locations such as a hub or node. The encoder 111 and splicer 112 are coupled with suitable signalling or provisioned to respond to signalling for portions of a video service where commercials are to be inserted. For instance, the encoder 111 may receive splice triggers and provide messaging that announces to the splicer 112 suitable splice points corresponding to the splice triggers.

The AI systems and methods disclosed herein are applicable to any video compression method performed according to a video compression specification allowing for at least one type of compressed picture that can depend on the corresponding decompressed version of each of more than one reference picture for its decompression and reconstruction. For example, the encoder 111 may compress an inputted video signal (e.g., provided by a service provider in one of any of several forms, image capture device, a headend server, etc.) according to the specification of the AVC standard and produce an AVC stream containing different types of compressed pictures with a common picture format, some that may have a first compressed portion that depends on a first reference picture for their decompression and reconstruction, and a second compressed portion of the same picture that depends on a second and different reference picture. Since the compressed video (and audio) streams are produced in accordance with the syntax and semantics of a designated video (and audio) coding method, for example AVC, the compressed video (and audio) streams can be interpreted by an AVC-compliant decoder for decompression and reconstruction at the time of reception, at a future time, or both.

In one embodiment, each AVC stream is packetized into transport packets according to the syntax and semantics of transport specification, such as, for example, MPEG-2 transport defined in MPEG-2 systems. Each transport packet contains a header with a unique packet identification code, or PID, associated with the respective AVC stream. In one implementation, the encoded audio-video (A/V) content for a single program may be the only program carried in a transport stream (e.g., one or more packetized elementary stream (PES) packet streams sharing a common time base for the same video service), and in other implementations, the encoded A/V content for multiple programs may be carried as multiplexed programs in an MPEG-2 transport stream, each program associated with its own respective time base.

The header of a transport stream may include a sync byte that sets the start of a transport stream packet and allows transmission synchronization. The header of the transport stream may further include a payload unit start indicator that, when set to a certain value in the packets carrying the video stream, indicates that the transport packet's payload begins with a first byte of a packetized elementary stream (PES). Video streams carried in a PES may be constrained to carrying one compressed picture per PES packet, and to a requirement that a PES packet must always commence as the first byte of a transport streams' packet payload. Thus, the payload unit start indicator provisions the identification of the start of each successive picture of the video stream carried in the transport stream. Note that the transport packets carrying the video stream are identified by the parsing capabilities of DHCT 200 or other network devices from program associated information or program specific information (PSI). For instance, in MPEG-2 Transport, program map tables identify the packet identifier (PID) of the video stream in the program map table (PMT), which in turn is identified via the program association table (PAT).

In IPTV implementations, the program or transport stream may be further encapsulated in Internet protocol (IP) packets, and delivered via multicast (e.g., according to protocols based on Internet Group Management Protocol (IGMP), among other protocols), or in other cases such as video-on-demand (VOD), via unicast (e.g., Real-time Streaming Protocol or RTSP, among other protocols). For instance, multicast may be used to provide multiple user programs destined for many different subscribers. Communication of IP packets between the headend 110 and the DHCTs 200 may be implemented according to one or more of a plurality of different protocols or communication mechanisms, such as User Datagram Protocol (UDP)/IP, Transmission Control Protocol (TCP)/IP, transport packets encapsulated directly within UDP or Real-time Transport Protocol (RTP) packets, among others.

The encoder 111 provides a compressed video stream (e.g., in a transport stream) to the splicer 112 while both receive signals or cues that pertain to splicing or digital program insertion at the transport level. In some embodiments, the splicer 112 and/or DHCT 200 may receive information at other levels (e.g., non-transport levels, such as video coding levels), in lieu of or in addition to the transport stream information. In some embodiments, the encoder 111 does not receive these signals or cues.

In one embodiment of an AI system, the encoder 111 provides the assistive information corresponding to a splice point. As explained previously, the presence in a transport packet of the splice point that corresponds to the splice point corresponding to a PTS (e.g., as communicated via SCTE-35 messaging) may be announced to the splicer 112 via an SCTE adaptation field data descriptor in an elementary stream (ES) loop (e.g., ES_info_loop) of a program specific information table, such as a program map table (PMT). In one embodiment, the splice point is signaled immediately prior to the out-point in decode order, or in some embodiments, N pictures ahead.

The transport packet announced in advance via the SCTE adaptation field data descriptor in the ES_info_loop carries the assistive information in the adaptation field, such as in the private data bytes of the adaptation field. The assistive information may be provided, in embodiment, by a construct such as:

[TAG] [LENGTH] [DATA]

In one embodiment, a specific TAG value is assigned to this particular type of assistive information, and the data carries the assistive information described herein (e.g., DPB properties, the manner of output of YTBOP residing in the same, and/or compressed picture buffer (CPB) properties, such as DTS-STC, buffer level (e.g., top and/or bottom bounds), AVC level (e.g., L3.0, L4.0, L4.2, using, for instance, two bits), among other properties). The provision of the announcement and assistive information in the transport layer avoids the need to parse all the encapsulating layers to find information in the video stream.

In some embodiments, the assistive information and the announcement (e.g., announcing the splice point or packet just prior to the splice point corresponding to where the assistive information is to become effective) are combined in a single packet, and in some embodiments, the announcement and/or the assistive information is not provided (e.g., is optionally provided or functionality conforming to the information is implied).

The splicer 112 splices one or more video streams (e.g., tail streams, such as provided by a video source separate from the video source that provides the first video stream) into designated portions of the video stream (e.g., head stream) provided by the encoder 111 according to one or more suitable splice points, and/or in some embodiments, replaces one or more of the video sequences provided by the encoder 111 with other video sequences. Further, the splicer 112 may pass the assistive information provided by the encoder 111, with or without modification, to the DHCT 200, or the encoder 111 may provide the information directly (bypassing the splicer 112) to the DHCT 200.

Having described features of certain embodiments of the headend 110, attention is directed to the other portions of the STS 100 shown in FIG. 1. The network 130 may comprise a single network, or a combination of networks (e.g., local and/or wide area networks). Further, the communications medium of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or are compliant to MPEG-2 transport or other transport layers or protocols.

The DHCT 200 is typically situated at a user's residence or place of business and may be a stand-alone unit or integrated into another device such as, for example, the display device 140, a personal computer, personal digital assistant (PDA), mobile phone, among other devices. In other words, the DHCT 200 (also referred to herein as a digital receiver or processing device or client device) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the DHCT 200 may be coupled to the display device 140 (e.g., computer monitor, television set, etc.), or in some embodiments, may comprise an integrated display (with or without an integrated audio component).

The DHCT 200 receives signals (video, audio and/or other data) including, for example, digital video signals in a compressed representation of a digitized video signal such as, for example, AVC streams modulated on a carrier signal, and/or analog information modulated on a carrier signal, among others, from the headend 110 through the network 130, and provides reverse information to the headend 110 through the network 130. As explained further below, the DHCT 200 comprises, among other components, a video decoder and a decoded picture buffer (DPB).

The television services are presented via respective display devices 140, each which typically comprises a television set that, according to its type, is driven with an interlaced scan video signal or a progressive scan video signal. However, the display devices 140 may also be any other device capable of displaying video images including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or DHCT 200. Although shown communicating with a display device 140, the DHCT 200 may communicate with other devices that receive, store, and/or process video streams from the DHCT 200, or that provide or transmit video streams or uncompressed video signals to the DHCT 200.

The STS 100 comprises additional components and/or facilities not shown, as should be understood by one having ordinary skill in the art. For instance, the STS 100 may comprise one or more additional servers (Internet Service Provider (ISP) facility servers, private servers, on-demand servers, channel change servers, multi-media messaging servers, program guide servers), modulators (e.g., QAM, QPSK, etc.), routers, bridges, gateways, multiplexers, transmitters, and/or switches (e.g., at the network edge, among other locations) that process and deliver and/or forward (e.g., route) various digital services to subscribers.

In one embodiment, the AI system comprises the headend 110 and one or more of the DHCTs 200. In some embodiments, the AI system comprises portions of each of these components, or in some embodiments, one of these components or a subset thereof. In some embodiments, one or more additional components described above yet not shown in FIG. 1 may be incorporated in an AI system, as should be understood by one having ordinary skill in the art in the context of the present disclosure.

Figure 2:
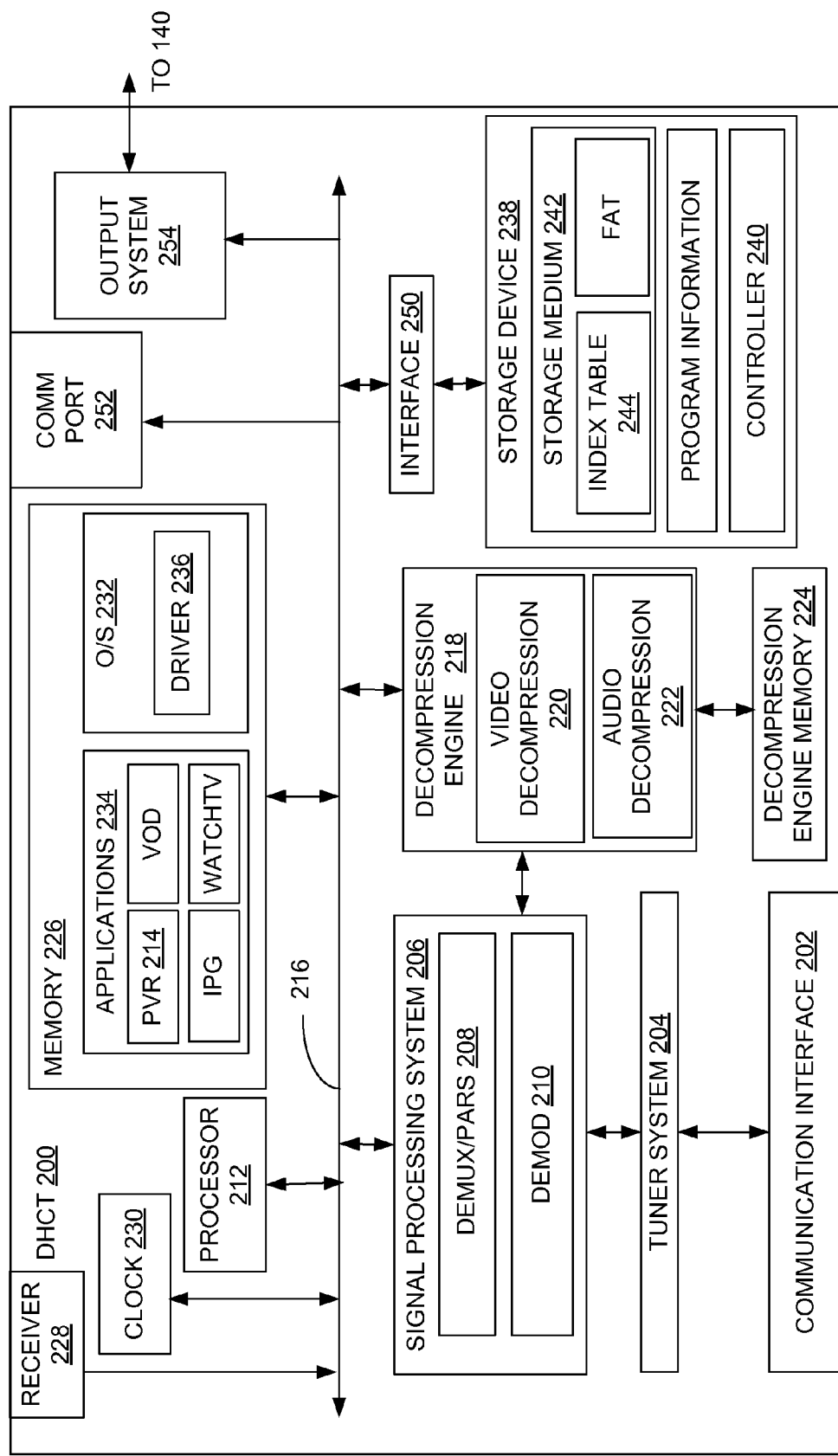
FIG. 2 is a block diagram of an example embodiment of a digital home communications terminal (DHCT).

FIG. 2 is an example embodiment of select components of a DHCT 200. It should be understood by one having ordinary skill in the art that the DHCT 200 shown in FIG. 2 is merely illustrative, and should not be construed as implying any limitations upon the scope of the disclosure. In one embodiment, an AI system may comprise all components shown in, or described in association with, the DHCT 200 of FIG. 2. In some embodiments, an AI system may comprise fewer components, such as those limited to facilitating and implementing decoding functionality. In some embodiments, functionality of the AI system may be distributed among the DHCT 200 and one or more additional devices as mentioned above.

The DHCT 200 includes a communication interface 202 (e.g., depending on the implementation, suitable for coupling to the Internet, a coaxial cable network, an HFC network, satellite network, terrestrial network, cellular network, etc.) coupled in one embodiment to a tuner system 204. The tuner system 204 includes one or more tuners for receiving downloaded (or transmitted) media content. The tuner system 204 can select from among a plurality of transmission signals provided by the STS 100 (FIG. 1). The tuner system 204 enables the DHCT 200 to tune to downstream media and data transmissions, thereby allowing a user to receive digital media content via the STS 100. In one embodiment, analog TV signals can be received via the tuner system 204. The tuner system 204 includes, in one implementation, an out-of-band tuner for bi-directional data communication and one or more tuners (in-band) for receiving television signals. In some embodiments (e.g., an IPTV-configured DHCT), the tuner system 204 may be omitted.

The tuner system 204 is coupled to a signal processing system 206 that in one embodiment comprises a transport demultiplexing/parsing system 208 (demux/pars, or hereinafter, demux) and a demodulating system 210 for processing broadcast and/or on-demand media content and/or data. One or more of the components of the signal processing system 206 may be implemented with software, a combination of software and hardware, or in hardware. The demodulating system 210 comprises functionality for demodulating analog or digital transmission signals.

The components of the signal processing system 206 are generally capable of QAM demodulation (though in some embodiments, other modulation formats may be processed such as QPSK, etc.), forward error correction, demultiplexing of MPEG-2 transport streams, and parsing of packets and streams. The signal processing system 206 has capabilities, such as filters, to detect bit patterns corresponding to fields in the transport packet's header information, adaptation field, and/or payload. Stream parsing may include parsing of packetized elementary streams or elementary streams. Packet parsing may include parsing and processing of data fields, such as the data fields in the adaptation fields in the transport packets that deliver assistive information, among other information.

In one embodiment, the parsing is performed by the signal processing system 206 (e.g., demux 208) extracting the assistive information and one or more processors 212 (one shown) processing and interpreting the assistive information. In some embodiments, the processor 212 performs the parsing, processing, and interpretation. The signal processing system 206 further communicates with the processor 212 via interrupt and messaging capabilities of the DHCT 200.

Concurrently, the signal processing system 206 precludes further processing of packets in the multiplexed transport stream that are irrelevant or not desired, such as packets of data corresponding to other video streams. As indicated above, parsing capabilities of the signal processing system 206 allow for the ingesting by the DHCT 200 of program associated information carried in the transport packets. The demux 208 is configured to identify and extract information in the transport stream to facilitate the identification, extraction, and processing of the compressed pictures. Such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information). For instance, in some embodiments, a flag, field, or other indicator may be provided in the transport stream (e.g., adaptation field of one or more transport packets) that indicates to the decoding logic (or other components of the DHCT 200) that the video stream includes certain information to assist in decoding of concatenated streams.

In general, information extracted by the demux 208 may include information that assists PVR logic embodied in one embodiment as PVR application 214, as explained further below. Note that in some embodiments, the PVR application 214 may opt to disregard or modify the received information. In some embodiments, portions of the information may not be transmitted for defined periods of time of a program, or for portions of a video stream, such as portions corresponding to a commercial.

In an alternate embodiment, assistive information is extracted from the video stream and processed by decompression engine 218. In yet another embodiment, assistive information is extracted from the video stream and processed by processor 212. And in yet another embodiment, assistive information is extracted from the video stream by decompression engine 218 and interpreted by processor 212.

In one embodiment, the demux 208 is configured with programmable hardware (e.g., PES packet filters). In some embodiments, the signal processing system 206 or one or more components thereof is configured in software, hardware, or a combination of hardware and software.

The signal processing system 206 is coupled to one or more busses (a single bus 216 is shown) and to decoding logic configured in one embodiment as a decompression engine 218 (or media engine). In some embodiments, reference to decoding logic may include one or more additional components, such as memory, processor 212, etc. The decompression engine 218 comprises a video decompression engine 220 (or video decoder or video decompression logic) and audio decompression engine 222 (or audio decoder or audio decompression logic). The decompression engine 218 is further coupled to decompression engine memory 224 (or media memory or memory), the latter which, in one embodiment, comprises one or more respective buffers for temporarily storing compressed (compressed picture buffer or bit buffer, not shown) and/or reconstructed pictures (decoded picture buffer or DPB). In some embodiments, one or more of the buffers of the decompression engine memory 224 may reside in whole or in part in other or additional memory (e.g., memory 226) or components.

The DHCT 200 further comprises additional components coupled to the bus 216. For instance, the DHCT 200 further comprises a receiver 228 (e.g., infrared (IR), radio frequency (RF), etc.) configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), the processor 212 (indicated above) for controlling operations of the DHCT 200, and a clock circuit 230 comprising phase and/or frequency locked-loop circuitry to lock into a system time clock (STC) from a program clock reference, or PCR, received in the video stream to facilitate decoding and output operations.

For instance, time stamp information (e.g., presentation time stamp/decode time stamp, or PTS/DTS) in the received video stream is compared to the reconstructed system time clock (STC) (generated by the clock circuit 230) to enable a determination of when the buffered compressed pictures are provided to the video decompression engine 220 for decoding (DTS) and when the buffered, decoded pictures are output by the video decompression engine 220 according to their PTS via the output system 254. The output system 254 hence may comprise graphics and display pipelines and output logic including HDMI, DENC, or other known systems. In some embodiments, the clock circuit 230 may comprise plural (e.g., independent or dependent) circuits for respective video and audio decoding operations and output processing operations. Although described in the context of hardware circuitry, some embodiments of the clock circuit 230 may be configured as software (e.g., virtual clocks) or a combination of hardware and software.

The DHCT 200 further comprises memory 226, which comprises volatile and/or non-volatile memory, and is configured to store executable instructions or code associated with an operating system (O/S) 232, one or more other applications 234 (e.g., the PVR application 214, interactive programming guide (IPG), video-on-demand (VOD), WatchTV (associated with broadcast network TV), among other applications not shown such as pay-per-view, music, etc.), and driver software 236.

The DHCT 200 further comprises one or more storage devices (one shown, storage device 238). The storage device 238 may be located internal to the DHCT 200 and coupled to the bus 216 through a communication interface 250. The communication interface 250 may include an integrated drive electronics (IDE), small computer system interface (SCSI), IEEE-1394 or universal serial bus (USB), among others. In one embodiment, the storage device 238 comprises associated control logic, such as a controller 240, that in coordination with one or more associated drivers 236 effects the temporary storage of buffered media content and/or more permanent storage of recorded media content. Herein, references to write and/or read operations to the storage device 238 is understood to refer to write and/or read operations to/from one or more storage mediums of the storage device 238.

The device driver 236 is generally a software module interfaced with and/or residing in the operating system 232. The device driver 236, under management of the operating system 232, communicates with the storage device controller 240 to provide the operating instructions for the storage device 238. As conventional device drivers and device controllers are well known to those of ordinary skill in the art, further discussion of the detailed working of each will not be described further here. The storage device 238 may further comprise one or more storage mediums 242 such as hard disk, optical disk, or other types of mediums, and an index table 244, among other components (e.g., FAT, program information, etc.) as should be understood by one having ordinary skill in the art. In some embodiments, the storage device 238 may be configured as non-volatile memory or other permanent memory.

In one implementation, video streams are received in the DHCT 200 via communications interface 202 and stored in a temporary memory cache (not shown). The temporary memory cache may be a designated section of memory 226 or an independent memory attached directly, or as part of a component in the DHCT 200. The temporary cache is implemented and managed to enable media content transfers to the storage device 238 (e.g., the processor 212 causes the transport stream in memory 226 to be transferred to a storage device 238). In some implementations, the fast access time and high data transfer rate characteristics of the storage device 238 enable media content to be read from the temporary cache and written to the storage device 238 in a sufficiently fast manner. Multiple simultaneous data transfer operations may be implemented so that while data is being transferred from the temporary cache to the storage device 238, additional data may be received and stored in the temporary cache.

Alternatively or additionally, the storage device 238 may be externally connected to the DHCT 200 via a communication port, such as communication port 252. The communication port 252 may be configured according to IEEE-1394, USB, SCSI, or IDE, among others. The communications port 252 (or ports) may be configured for other purposes, such as for receiving information from and/or transmitting information to devices other than an externally-coupled storage device.

One having ordinary skill in the art should understand that the DHCT 200 may include other components not shown, including compression engine, decryptors, samplers, digitizers (e.g., analog-to-digital converters), multiplexers, conditional access processor and/or application software, Internet browser, among others. In some embodiments, functionality for one or more of the components illustrated in, or described in association with, FIG. 2 may be combined with another component into a single integrated component or device or distributed among several components or devices.

The AI system may comprise the entirety of the DHCT 200 in one embodiment, the headend 110 in some embodiments, or a combination of both components in certain embodiments. In some embodiments, the AI system may comprise or one or more components or sub-components thereof, or additional components not shown. The AI system (including in some embodiments the splicer 112 (or portions thereof), the encoder 111 (or portions thereof), and/or the DHCT 200 (or portions thereof)), may be implemented in hardware, software, firmware, or a combination thereof. To the extent certain embodiments of the AI system or a portion thereof are implemented in software or firmware, executable instructions for performing one or more tasks of the AI system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the AI system or portions thereof are implemented in hardware, the AI system may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having described an example environment and corresponding components of certain embodiments of AI systems, attention is directed to FIGS. 3A and 3B, which respectively provides an illustration of the provision (and absence thereof) of assistive information pertaining to DPB properties. FIG. 3A shows a network feed 302 in decode order and in output order 304. The network feed 302 comprises three consecutive, equal-length segments 306, 308, and 310, and the output order version similarly comprises three consecutive, equal length segments 312, 314, and 316. The decode order stream 304 further illustrates network out-point (splice-out point) 305 and network in-point (splice-in point) 307 corresponding to the spliced-in second or tail stream 314. In other words, for the output order version 304, segments 312 and 316 each comprise a portion of a head stream, and segment 314 comprises a tail stream spliced into the head stream between segments 312 and 316. Based on assistive information conveyed in the associated transport stream (e.g., as described above), the YTBOP of the DPB associated with the head stream is incorporated into each splice point 305 and 307 to provide a graceful transition between concatenations. In other words, each splice point 305 and 307 corresponds respectively to YTBOP 318 and 320 of a DPB. The spliced in-point 307 requires the following buffering: $(PTS_{in-1} - DTS_{in-i}) = YTBOP+1$, where YTBOP is the number of yet to be output pictures in the head stream 312 at the splice-out point, $PTS_{in-1}$ is the first output picture in the tail stream 314, and $DTS_{in-1}$ is the first DTS in the tail stream 314. For purposes of illustration, each YTBOP comprises six pictures representing 25% of the frame rate (e.g., for each splice point, representing approximately 0.25 seconds).

FIG. 3B similarly comprises an example where the YTBOP interval described above is not honored, and in particular, illustrating the need for the in-point to abide by $(PTS_{in-1} - DTS_{in-i}) = YTBOP+1$. In particular, a decode order stream 322 and output order version 324 each comprise plural consecutive segments (326, 328, 330 for the decode order 322 and 332, 336, and 338 for the output order 324). As shown, without the YTBOP interval at the splice-out point 309, the tail stream 336 is spliced in, using the example parameters above, 0.25 seconds too early. Such a result may occur due to a no_output_of_prior_pics_flag equal to one (1). As expressed above, with gaps in output time (e.g., non-contiguous PTS) of pictures in the DPB yet to be output at the splice point, a compliant AVC decoder is challenged—the no_output_of_prior_pics_flag is set equal to one (1) to prevent the output of those YTBOP pictures in the DPB. If the output of these decoded pictures is skipped (e.g., not displayed), a splicing device needs to improvise to for a number of output intervals equal to the number of DPB pictures that are not output (e.g., per a YTBOP flag) while accumulating pictures into the CPB to raise buffer levels (e.g., to avoid buffer underflow). With multiple splice operations, as noted above, the skipping of decoded pictures raises the risk of buffer underflow. If the latest PTS among the pictures yet to be output in the DPB at the splice point is signaled (e.g., last_PTS_flag), then a splicing device, without having to decode and determine based on the decoding operation, knows to provide that many pictures (delay their output) to compensate for the non-output, decoded pictures. While filling the CPB, a receiver either has to blank out pictures (e.g., black pictures, such as the 0.50 second interval shown in FIG. 3B) or continuously repeat the last output picture prior to the splice point. One mechanism to achieve this function is by the splicing device signaling the last output picture to be repeated. Further, byte stuffing in blank pictures may raise the CPB buffer level. Accordingly, the assistive information pertaining to the DPB properties includes, in one embodiment, the configuring of the YTBOP of the head stream (at the out-point) with a maximum of sixteen 16 (e.g., four (4) bits), and a YTBOP_flag that provides all YTBOP pictures in the DPB have successive picture-output times and the first output time of the YTBOP pictures is the first frame interval after the out-point.

The YTBOP intervals at each splice point allow for an overlap transition period over YTBOP frame intervals, enabling a graceful output transition and/or better bit-rate management. In other words, the inclusion of the YTBOP intervals enables the splicer 112 to perform better stream conditioning, where pictures from the headstream are output from the DPB while pictures from the tail stream are being decoded and stored in the DPB, while avoiding error in CPB buffer management.

In some embodiments, as expressed above, optional assistive information may be provided to the DHCT 200 when there are YTBOPs in the DPB having discontinuous output times, for instance in non-seamless applications. For instance, one example embodiment of "yet to be output pictures" (YTBOP) message syntax is as follows:

|  | C | Descriptor |
|---|---|---|
| pic_output_cue( payloadSize ) { |  |  |
|    num_prior_pics_in_dpb | 5 | u(5) |
|    for (j = 0; j < num_prior_pics_in_dpb; j++) { |  |  |
|       output_cue[ i ] | 5 | u(3) |
|    } |  |  |

This example message assists the DHCT 200 in outputting prior pictures remaining in DPB from the head stream. The message helps a decoder in the DHCT 200 to maintain continuous picture output for streams having YTBOPs with discontinuous output times. The YTBOP message semantics are described below as follows:

num_prior_pics_in_dpb indicates the number of YTBOP remaining in the DPB at the splice out-point.
output_cue[i] indicates cues for the output of each respective YTBOP in the DPB, according to the Table below. The pictures are sorted by corresponding picture order counts from smallest value to highest value.

| Value | Recommended output cue for picture |
|---|---|
| 0 | Picture may be discarded without output |
| 1 | Picture may be output according to picture's pic_struct* |
| 2 | Picture's output as indicated by pic_struct* may be repeated once |
| 3 | Picture's output as indicated by pic_struct* may be repeated twice |
| 4 | Picture's output as indicated by pic_struct* may be repeated indefinitely until first picture is output from DPB after the decoding of the IDR access unit |
| 5 . . . 7 | Reserved |

*For interlaced video source, repetition means that the last output field of an interlaced frame is output as both the top and bottom fields to satisfy the number of repetitions specified by output cue.

In some embodiments, assistive information messaging is provided that assists decoding logic of the DHCT 200 in processing YTBOPs of the DPB where discontinuities or gaps arise from no_output_of_prior_pics_flags with a value of one (1) alone or in association with an IDR access unit. For instance, when a compliant (e.g., compliant to MPEG-2) DHCT receives a no_output_of_prior_pics_flag=1, the compliant DHCT outputs a blank picture or frozen frame intervals. One alternative approach to handling such a stream parameter is to selectively control the output of each otherwise discarded DPB picture at the splice-out point. One example embodiment of assistive information configured as a picture output message syntax is as follows:

|  | C | Descriptor |
|---|---|---|
| pic_output( payloadSize ) { |  |  |
|    num_prior_pics_in_dpb | 5 | u(5) |
|    for (j = 0; j < num_prior_pics_in_dpb; j++) { |  |  |
|       output_cue[ i ] | 5 | u(3) |
|    } |  |  |

This example message applies to the control and management of YTBOPs from the DPB at splice out-points. The pictures output message semantics are described below as follows:

num_prior_pics_in_dpb indicates the number of YTBOPs in the DPB at a corresponding splice out-point. This may be accompanied by an IDR access unit and issuance of the no_output_of_prior_Pics_flag in AVC video with a value of 1.

output_cue[i] indicates cues for the output of each prior picture in the DPB, according to the following Table. The pictures are sorted by corresponding picture order counts from smallest value to highest value. The decoder may make use of the output_cue for better visual experience.

| Value | Recommended output cue for picture |
|---|---|
| 0 | Picture may be discarded without output |
| 1 | Picture may be output according to picture's pic_struct* |
| 2 | Picture's output as indicated by pic_struct* may be repeated once |
| 3 | Picture's output as indicated by pic_struct* may be repeated twice |
| 4 | Picture's output as indicated by pic_struct* may be repeated indefinitely until first picture is output from DPB after the decoding of the IDR access unit |
| 5 | Repeat picture output as indicated by pic_struct* until the output time of the next picture in the DPB. |
| 6 | Output the last picture once again* |
| 7 | Reserved |

*For interlaced video source, repetition means that the last output field of an interlaced frame is output as both the top and bottom fields to satisfy the number of repetitions specified by output cue.

Through the use of the assistive information provided via these or other suitable message syntaxes, pictures may be output from the DPB in a manner that reduces output discontinuities and gaps at non-seamless concatenations. For instance, rather than outputting a last picture of the DPB repeatedly at a concatenation when no_output_of_prior_pics_flag is equal to one (1) (due to non-contiguous output times or gaps), the assistive information comprises a mechanism to issue a control command for each YTBOP in the DPB such that some pictures are repeated and/or some pictures are displayed only once.

It is noted that in some embodiments, the second field of an interlaced frame may be repeated just once. For instance, for a top-field-first frame, one display order is as follows: top-field (at top-field position), bottom-field (at bottom-field position), bottom-field (at top-field position). One benefit of such a scheme, among others, is that of assisting the display process of the DHCT 200 in case of a splice that leads to a field parity violation at the splice point. In other words, sometimes for a transition in field parity at a splice, there is a need for an odd number of fields (by repetition of the last field of an interlaced frame), and with the last field position on the lines of the opposite parity (e.g., the lines of an odd field displayed on the even lines).

Figure 4:
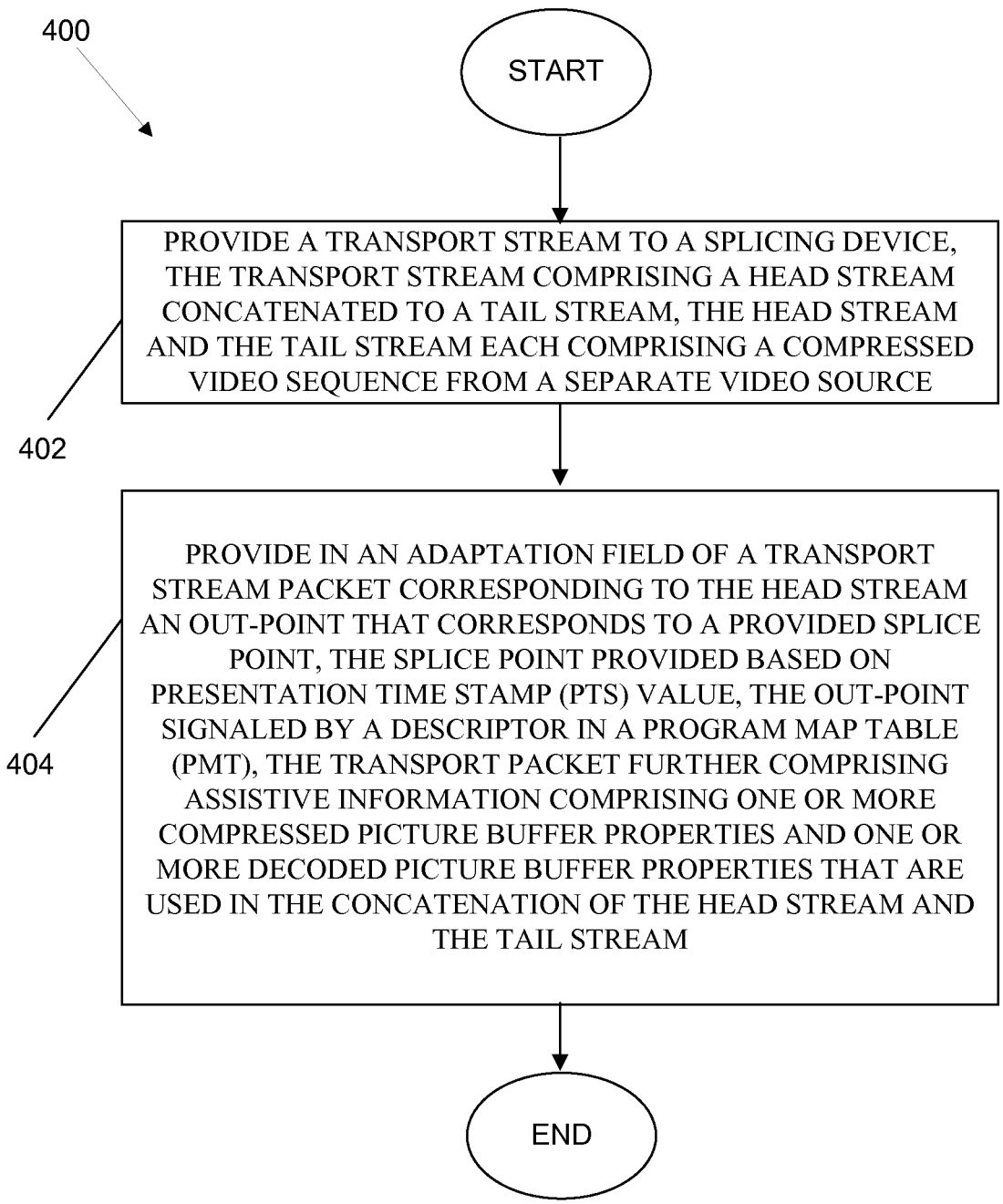
FIG. 4 is a flow diagram that illustrates an example headend side method for providing splice-out point properties.

In view of the above description, it should be appreciated that one AI method embodiment 400, implemented by the headend 110 and shown in FIG. 4, comprises providing a transport stream to a splicing device, the transport stream comprising a head stream concatenated to a tail stream, the head stream and the tail stream each comprising a compressed video sequence from a separate video source (402); providing in an adaptation field of a transport stream packet corresponding to the head stream an out-point that corresponds to a provided splice point, the splice point provided based on presentation time stamp (PTS) value, the out-point signaled by a descriptor in a program map table (PMT), the transport packet further comprising assistive information comprising one or more compressed picture buffer (CPB) properties and one or more decoded picture buffer (DPB) properties that are used in the concatenation of the head stream and the tail stream (404).

Figure 5:
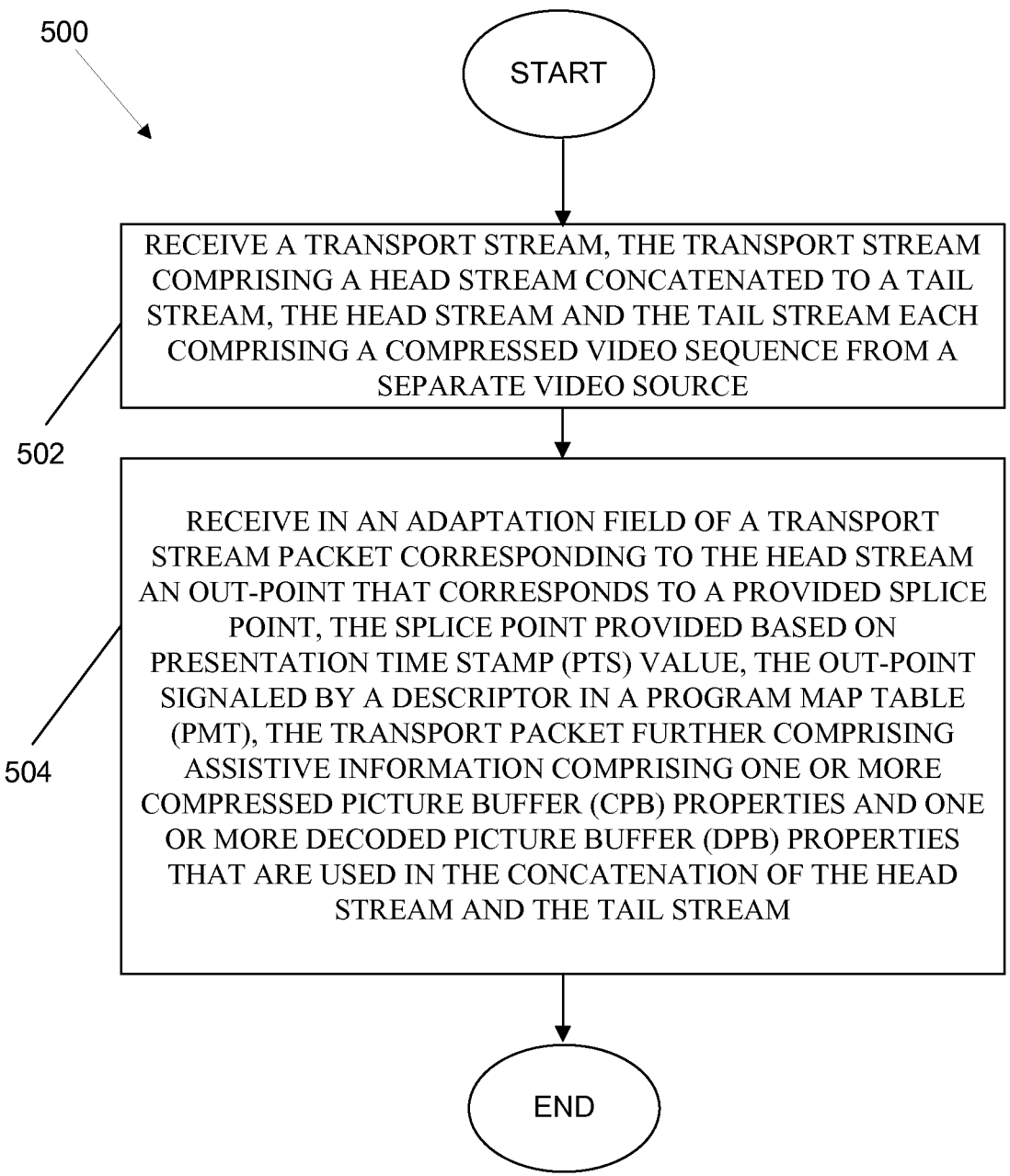
FIG. 5 is a flow diagram that illustrates an example splicer method for receiving and processing splice-out point properties.

In view of the above description, it should be appreciated that another AI method embodiment 500, as shown in FIG. 5 and implemented by a splicer 112, comprises receiving a transport stream, the transport stream comprising a head stream concatenated to a tail stream, the head stream and the tail stream each comprising a compressed video sequence from a separate video source (502); and receiving in an adaptation field of a transport stream packet corresponding to the head stream an out-point that corresponds to a provided splice point, the splice point provided based on presentation time stamp (PTS) value, the out-point signaled by a descriptor in a program map table (PMT), the transport packet further comprising assistive information comprising one or more compressed picture buffer (CPB) properties and one or more decoded picture buffer (DPB) properties that are used in the concatenation of the head stream and the tail stream (504).

Note that the methods described in FIGS. 4-5 may also be implemented in other components or systems, in whole or in part, such as at a client device, hub, etc.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 4-5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 4-5, either in the beginning, end, and/or as intervening steps, and that in some embodiments, fewer steps may be implemented.

It should be emphasized that the above-described embodiments of the disclosure are merely possible examples, among others, of the implementations, setting forth a clear understanding of the principles of the disclosure. Many variations and modifications may be made to the above-described embodiments without departing substantially from the principles set forth herein. All such modifications and variations are intended to be included herein within the scope of the disclosure. In addition, the scope of the disclosure includes embodying the functionality of the embodiments in logic embodied in hardware and/or software-configured mediums.

At least the following is claimed:

1. A method, comprising:
receiving a transport stream comprising a head stream and a tail stream, the head stream and the tail stream each comprising a compressed video sequence from a separate video source;
processing an adaptation field of a transport packet corresponding to the head stream, the adaptation field comprising a splice out-point that corresponds to a splice point, the splice point provided based on a presentation time stamp value, the splice out-point signaled by a descriptor in a program map table, the transport packet further comprising assistive information comprising one or more compressed picture buffer properties and one or more decoded picture buffer properties; and
concatenating the head stream and the tail stream based on the compressed picture buffer properties and the decoded picture buffer properties, wherein the compressed picture buffer properties comprise at least a coding level, wherein the compressed picture buffer properties further comprise one or more of a value corresponding to a decoded time stamp value minus a system time clock value, a buffer level, and an intended compressed picture buffer upper bound level and compressed picture buffer lower bound level, wherein the decoded picture buffer properties comprise a first flag corresponding to a presentation time stamp value corresponding to a last picture in the decoded picture buffer, wherein the decoded picture buffer properties further comprise a second flag, the second flag signaling that all pictures yet to be output residing in the decoded picture buffer have successive picture output times, wherein the second flag further signals a first output time of the pictures yet to be output, and wherein the first output time corresponds to a first frame interval after the splice out-point, the first frame interval enabling pictures from the headstream to be outputted in the decoded picture buffer while pictures from the tail stream are being decoded and stored in the decoded picture buffer.

2. The method of claim 1, wherein the provided splice point is received according to a message compliant with Society of Cable and Telecommunications Engineers Standard 35—Digital Program Insertion Cueing Message for Cable.

3. The method of claim 1, wherein the transport packet is located immediately prior to the splice out-point connecting the head stream to the tail stream.

4. The method of claim 1, wherein the descriptor comprises an elementary stream descriptor loop of the program map table.

5. The method of claim 1, wherein the coding level comprises an Advanced Video Coding level.

6. The method of claim 1, wherein the compressed picture buffer properties further comprise a value corresponding to a decoded time stamp value minus a system time clock value.

7. The method of claim 1, wherein the compressed picture buffer properties further comprise a value corresponding to a decoded time stamp value minus a system time clock value and a buffer level.

8. The method of claim 1, further comprising honoring a yet to be output picture interval at the splice out-point and a splice in-point, the splice in-point corresponding to the splice in point connecting the tail stream to the head stream.

9. The method of claim 1, wherein responsive to a no_ouput_of_prior_pics_flag_value equal to one (1), outputting pictures equal to a value corresponding to a last_PTS flag provided in the assistive information while filling a compressed picture buffer.

10. The method of claim 9, wherein outputting the pictures comprises repeating a last picture output prior to the splice out-point.

11. The method of claim 9, wherein outputting the pictures comprises repeating the output of blank pictures.

12. A digital home communications terminal, comprising:
a processor configured to:
receive an adaptation field of a transport stream packet corresponding to a head stream a splice out-point that corresponds to a provided splice point, the splice point provided based on a presentation time stamp value, the splice out-point signaled by a descriptor in a program map table;
receive a compressed picture buffer property corresponding to a coding level of the transport stream packet; and
receive decoded picture buffer properties comprising a first flag corresponding to a last presentation time stamp value corresponding to a last picture in the decoded picture buffer, and a second flag signaling that all of the plurality of pictures yet to be output residing in the decoded picture buffer have successive picture output times, wherein the compressed picture buffer properties further comprise one or more of a value corresponding to a decoded time stamp value minus a system time clock value, a buffer level, and an intended compressed picture buffer upper bound level and compressed picture buffer lower bound level, wherein the second flag further signals a first output time of the pictures yet to be output, wherein the first output time corresponds to a first frame interval after the splice out-point, the first frame interval enabling pictures from the headstream to be outputted in the decoded picture buffer while pictures from the tail stream are being decoded and stored in the decoded picture buffer.

13. The digital home communications terminal of claim 12, wherein the head stream is concatenated to a tail stream, the head stream and the tail stream each comprising a compressed video sequence from a separate video source.

14. The digital home communications terminal of claim 13, the processor further configured to honor a yet to be output picture interval at the splice out-point and a splice in-point, the splice in-point corresponding to the splice in point connecting the tail stream to the head stream.

15. The digital home communications terminal of claim 13, the processor further configured to output pictures equal to a value corresponding to a last_PTS flag provided in the assistive information while filling a compressed picture buffer responsive to a no_ouput_of_prior_pics_flag_value equal to one (1).

16. The digital home communications terminal of claim 13, the processor further configured to, wherein outputting the pictures comprises repeating a last picture output prior to the splice out-point.

17. The digital home communications terminal of claim 12, wherein The decoded picture buffer properties comprises a first flag corresponding to a last presentation time stamp value corresponding to a last picture in the decoded picture buffer and a second flag, the second flag signaling that all of the plurality of picture yet to be outputs residing in the decoded picture buffer have successive picture output times.

18. A client device, comprising:
a processor configured to:
receive a transport stream comprising a head stream and a tail stream, the head stream and the tail stream each comprising a compressed video sequence from a separate video source; and
process an adaptation field of a transport packet corresponding to the head stream a splice out-point that corresponds to a splice point, the splice point provided based on a presentation time stamp value, the splice out-point signaled by a descriptor in a program map table, the transport packet further comprising assistive information comprising one or more compressed picture buffer properties and one or more decoded picture buffer properties; and
concatenate the head stream and the tail stream based on the compressed picture buffer properties and the decoded picture buffer properties, wherein the compressed picture buffer properties comprise at least a coding level, wherein the compressed picture buffer properties further comprise one or more of a value corresponding to a decoded time stamp value minus a system time clock value, a buffer level, and an intended compressed picture buffer upper bound level and compressed picture buffer lower bound level, wherein the decoded picture buffer properties comprise a first flag corresponding to a presentation time stamp value corresponding to a last picture in the decoded picture buffer, wherein the decoded picture buffer properties further comprise a second flag, the second flag signaling that all pictures yet to be output residing in the decoded picture buffer have successive picture output times, wherein the second flag further signals a first output time of the pictures yet to be output, and wherein the first output time corresponds to a first frame interval after the splice out-point, the first frame interval enabling pictures from the headstream to be outputted in the decoded picture buffer while pictures from the tail stream are being decoded and stored in the decoded picture buffer.

* * * * *